(12) United States Patent
Mori

(10) Patent No.: US 11,221,265 B2
(45) Date of Patent: Jan. 11, 2022

(54) CONTACT DETECTING DEVICE

(71) Applicant: MIE ROBOT EXTERIOR TECHNOLOGY LABORATORY CO., LTD., Mie (JP)

(72) Inventor: Daisuke Mori, Yokkaichi (JP)

(73) Assignee: MIE ROBOT EXTERIOR TECHNOLOGY LABORATORY CO., LTD., Mie (JP)

( * ) Notice: Subject to any disclaimer, the term of this patent is extended or adjusted under 35 U.S.C. 154(b) by 69 days.

(21) Appl. No.: 16/628,877

(22) PCT Filed: Oct. 5, 2018

(86) PCT No.: PCT/JP2018/037365
§ 371 (c)(1),
(2) Date: Jan. 6, 2020

(87) PCT Pub. No.: WO2019/202755
PCT Pub. Date: Oct. 24, 2019

(65) Prior Publication Data
US 2020/0209082 A1  Jul. 2, 2020

(30) Foreign Application Priority Data

Apr. 20, 2018 (JP) .............................. JP2018-081417

(51) Int. Cl.
*G01L 5/00* (2006.01)
*G01L 1/02* (2006.01)
(Continued)

(52) U.S. Cl.
CPC .............. *G01L 5/0052* (2013.01); *G01L 1/02* (2013.01); *B29C 39/02* (2013.01); *B29K 2105/046* (2013.01)

(58) Field of Classification Search
CPC ......... G01L 5/0052; G01L 1/02; B29C 39/02; B29K 2105/046
See application file for complete search history.

(56) References Cited

U.S. PATENT DOCUMENTS 6,941,182 B2   9/2005 Selim et al.
9,091,605 B2   7/2015 Kawashima et al.
(Continued)

FOREIGN PATENT DOCUMENTS

CN    1898541 A      1/2007
EP    1 424 043 A1   6/2004
(Continued)

OTHER PUBLICATIONS

Office Action dated Nov. 30, 2020 in Chinese Application No. 201880032194.X.
(Continued)

*Primary Examiner* — Max H Noori
(74) *Attorney, Agent, or Firm* — Sughrue Mion, PLLC; Richard C. Turner

(57) ABSTRACT

To yield fixed output as electrical signal when any positions of volume space is subjected to external pressure and the external pressure is detected.
A contact detecting device includes a mounted base 60 with a predetermined shape, a design foam 10 that is bonded to the mounted base and covers it, and a limiter 7 that is mounted on the mounted base 60 or the design foam 10. The contact detecting device further includes a predetermined volume space 4 defined by the mounted base 60, the design foam 10, and the limiter 7. The contact detecting device further includes a sensor SEN that detects external pressure applied to the volume space 4 through the determination of the physical variation of the volume space 4. The physical variation of the volume space 4 is detected through the sensor determining, for example, variation in flow rate, flow (Continued)

velocity, or volume. In particular, the contact detecting device detects two-dimensional or three-dimensional contact on any position.

11 Claims, 16 Drawing Sheets

(51) Int. Cl.
*B29C 39/02* (2006.01)
*B29K 105/04* (2006.01)

(56) References Cited

U.S. PATENT DOCUMENTS

| | | | | |
|---|---|---|---|---|
| 9,780,121 | B2* | 10/2017 | Watanabe | G06F 3/0412 |
| 2004/0003471 | A1* | 1/2004 | VanSteenburg | A47C 27/081 |
| | | | | 5/709 |
| 2005/0148904 | A1* | 7/2005 | Mimura | A61B 5/447 |
| | | | | 600/587 |
| 2008/0264168 | A1* | 10/2008 | Stewart | G01C 19/5677 |
| | | | | 73/504.13 |
| 2010/0058855 | A1* | 3/2010 | Tadin | A61B 5/1036 |
| | | | | 73/172 |
| 2010/0268121 | A1* | 10/2010 | Kilborn | A61G 7/057 |
| | | | | 600/587 |
| 2011/0139516 | A1* | 6/2011 | Nirmal | G06F 3/0445 |
| | | | | 178/18.01 |
| 2014/0260678 | A1* | 9/2014 | Jentoft | G01L 5/228 |
| | | | | 73/862.046 |
| 2014/0366650 | A1* | 12/2014 | Thillainadarajah | G09B 19/0038 |
| | | | | 73/862.625 |
| 2016/0001496 | A1* | 1/2016 | Chow | G06F 3/0445 |
| | | | | 345/173 |
| 2018/0000255 | A1* | 1/2018 | Youngblood | A61B 5/4812 |
| 2019/0234818 | A1* | 8/2019 | Nada | G01L 5/00 |
| 2019/0319020 | A1* | 10/2019 | Pan | H01L 33/0093 |
| 2019/0324577 | A1* | 10/2019 | Pan | H01L 27/1266 |
| 2019/0326473 | A1* | 10/2019 | Choi | H01L 33/22 |

FOREIGN PATENT DOCUMENTS

| | | |
|---|---|---|
| EP | 2 703 796 A1 | 3/2014 |
| JP | 2005-125736 A | 5/2005 |
| JP | 2010-236220 A | 10/2010 |
| JP | 5704712 B2 | 4/2015 |
| JP | 5971638 B1 | 8/2016 |
| JP | 6083723 B1 | 2/2017 |
| JP | 6325732 B1 | 5/2018 |
| WO | 2012/147655 A1 | 11/2012 |
| WO | 2017/195418 A1 | 11/2017 |

OTHER PUBLICATIONS

International Search Report for PCT/JP2018/037365 dated Oct. 30, 2018 [PCT/ISA/210].
The Extended European Search Report dated Mar. 5, 2021, issued by the European Patent Office in application No. 18915722.5.
Translation of WO 2017/195418 A1, published Nov. 16, 2017 (reference submitted Jan. 6, 2020).

* cited by examiner

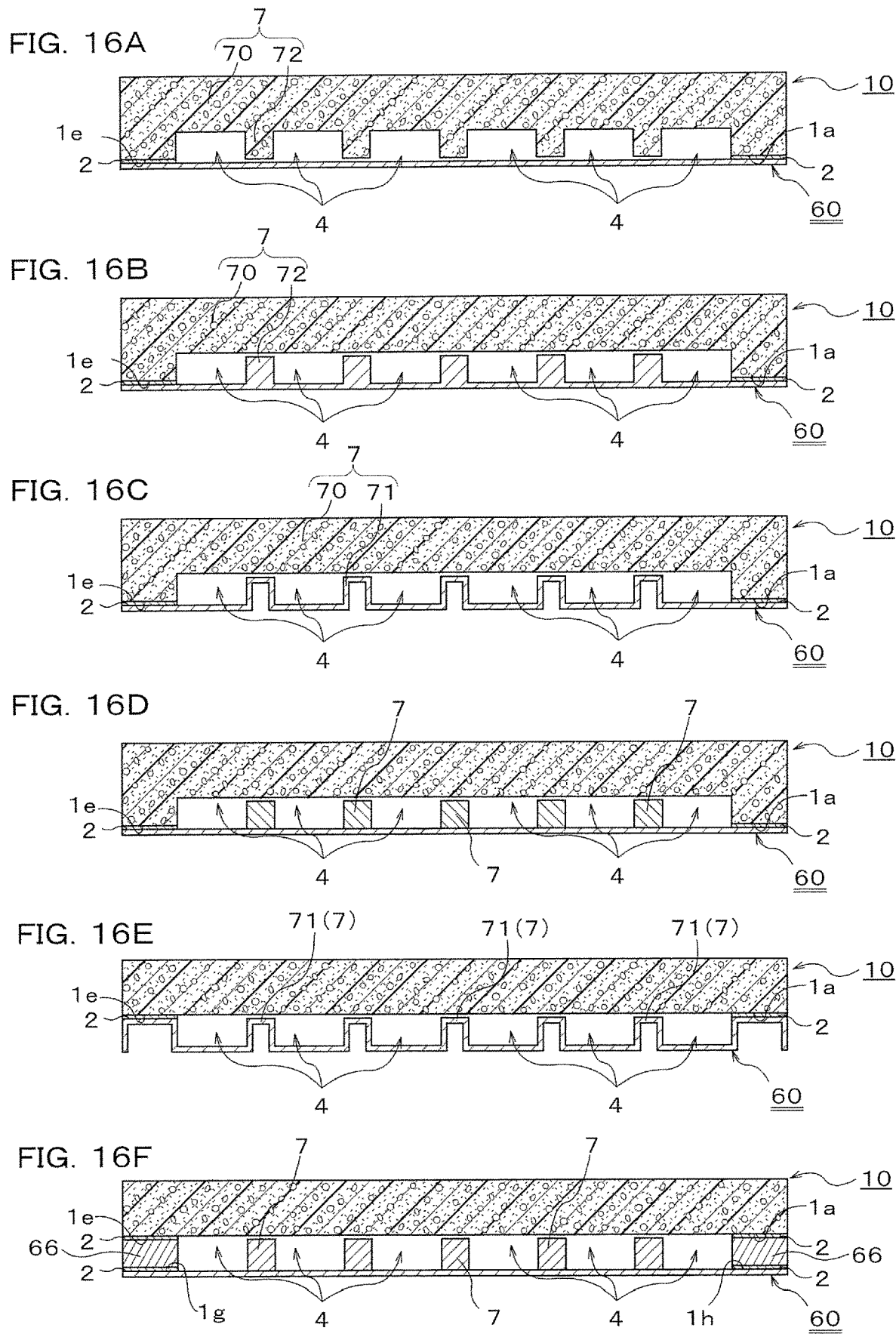

CONTACT DETECTING DEVICE

CROSS REFERENCE TO RELATED APPLICATIONS

This application is a National Stage of International Application No. PCT/JP2018/037365, filed on Oct. 5, 2018, which claims priority from Japanese Patent Application No. 2018-081417, filed on Apr. 20, 2018.

TECHNICAL FIELD

The present invention relates to a contact detecting device including a mounted base with a predetermined shape, a design foam mounted on the mounted base, and a limiter disposed in the inside of the design foam. The design foam is made of synthetic resin or synthetic rubber and has a predetermined shape. The limiter, which is integrated with a synthetic resin foam or a synthetic rubber foam, restricts the amount of physical variation. The mounted base, the design foam, and the limiter define a volume space. The contact detecting device detects the physical variation of the volume space using a sensor that determines the variation in flow rate, flow velocity, or volume. In particular, the present invention relates to a contact detecting device for detecting two-dimensional or three-dimensional contact on any position.

BACKGROUND ART

Conventionally, in a method for forming a foam synthetic resin molding, a foam synthetic resin molding typically includes a polystyrene foam having a coat film formed thereon. The polystyrene foam is a cured polystyrene including fine cells. For example, in the method, wood glue is applied to a polystyrene foam and then a coating material is splayed to the polystyrene foam with the cured glue.

Alternatively, water-based glue including pigment is directly applied to a polystyrene foam. Still another way, wood glue or starch paste is mixed with Japanese traditional paper 'washi' torn into powders and the resultant mixture is stuck to a polystyrene foam. Neo color or poster color as water-based glue is then applied to the polystyrene foam. Further another way, a polystyrene foam as a base is molded with fiberglass reinforced plastics (FRP).

Unfortunately, these ways provide foam synthetic resin moldings having a thick coat film. Such foam synthetic resin moldings having a thick coat film are unsuitable for practical use although they have fair appearance formally.

Patent document 1 discloses an interior component with a foamed layer. This has been founded by patent-searching related arts.

According to the patent document 1, a skin with a foamed layer is adsorbed to a base by vacuum suction of intake ports dispersed in the base, and is mounted on the base accordingly. In this event, the thermoplastic skin is softened by heating and then the softened skin is adsorbed to the base. The skin is shaped by vacuum suction when being sucked by vacuum suction for skin. Thus, the skin is shaped in conformance with the mold surface for vacuum forming. This art provides the surface of improved quality. Additionally, the surface has less limitation in the design and a lot of flexibility in the design. The skin can have non-similar shape to the surface of the base.

Thus, the interior component with a foamed layer includes the skin with a foamed layer. This skin is adsorbed to the base by vacuum suction of intake ports dispersed in the base, and is mounted on the base accordingly. This allows high bond strength between the foamed layer and the skin. Unfortunately, in the patent document 1, practice of the thick foamed layer is not described. It may be difficult to cut the foam synthetic resin into a predetermined shape in principle and to form the foam synthetic resin with a predetermined shape.

When the skin with a foamed layer has different thickness or shapes in the foamed layer, there is a variation in the detection of a certain applied external pressure.

Patent document 2 discloses a stack that includes a core with a synthetic resin foam, a tatami matt on the first surface of the core, a cushion sheet including function agent on the second surface of the core, and a slip resistant layer partially disposed on the cushion sheet. This art achieves thinness, weight saving, easy application, and anti-slip.

This cushion sheet is applicable to plane structure such as tatami. Unfortunately, when the foamed layer has different thickness or shapes, there is a variation in the detection of a certain applied external pressure.

Conventional and typical foam synthetic resin moldings are short of mechanical strength and causes peeled coat like dust to contaminate their surroundings, when being used in, for example, the covers of non-mass production products, the armrests of special chairs, the dashboards of special vehicles, or remodeled cars. Thus, conventional and typical foam synthetic resin moldings have not been practical use in low-priced. The FRP moldings of polystyrene foams as bases has higher mechanical strength. Unfortunately, such polystyrene foams with FRP has poor resilience and is expensive. The patent documents 1 and 2 disclose arts that achieves higher bond strength between the foam synthetic resin molding and the cushion sheet. In the patent documents 1 and 2, the foamed synthetic resin is formally used as material for making prototype. Unfortunately, the arts are not applied in small production. In particular, the foam synthetic resin molding such as expanded polystyrene foam fails to be formed into a predetermined shape by cutting the surface and fails to have flat surface with good appearance because of brittle.

CITATION LIST(S)

Patent Document(S)

[patent document 1] Japanese Unexamined Patent Application Publication No. 2005-125736.
[patent document 2] Japanese Unexamined Patent Application Publication No. 2010-236220.
[patent document 3] Japanese Patent Application No. 2017-170597.

SUMMARY OF INVENTION

Technical Problem

We then invented a contact detecting device described in patent document 3. The contact detecting device includes a base with a predetermined shape and a foam that covers the base. The foam is formed of a synthetic resin foam with a predetermined shape or a rubber foam with a predetermined shape. The contact detecting device further includes a predetermined volume space on one side of the base or the foam, which are opposed to each another, and a space holder with open-cell structure in the volume space. The contact detecting device further includes a reinforced layer for preventing compressed air in the volume space and the space holder from leaking through the base and the foam to open air. The contact detecting device further includes a flow sensor for detecting the physical variation of the volume space and the space holder.

This contact detecting device detects applied pressure widely. The contact detecting device can be applied to two-dimensional plane structure and three-dimensional structure. Thus, the contact detecting device detects a predetermined applied external pressure.

This contact detecting device, which detects the applied external pressure through the determination of the physical variation of the volume space, includes the base and the foam covering the base. The foam is made of foam synthetic resin or foam rubber. Thus, the foam might have stress when being deformed, dented, or sunk. Additionally, the detection output may vary in accordance with pressed position. The foam with an inverted U-shape has different intervals between the base and the foam. This causes the physical variation of the pressed foam with an inverted U-shape to vary, even if the foam has a uniform thickness. A fixed relationship between applied external pressure requires fine control as well as a fixed strength between the armpits and the chest of a humanoid robot.

Since the sensor output varies widely according to pressed position, a circuit with a single amplification fails to be used in the sensor. The sensor also varies in sensitivity. For example, a plurality of the sensors requires a plurality of threshold with binarization. Thus, the sensor might fail to operate depending on the set.

To solve the above problem, it is an object of the present invention to provide a contact detecting device, which detects physical variation resulting from external pressure on applied design surface and outputs the detection information as electrical signal, to allow the sensor output to have less variation in accordance with pressed position.

Means for Solving the Problem

A contact detecting device according to claim 1 of the present invention includes a mounted base with a predetermined shape, a design foam that is bonded to the mounted base and covers the mounted base, and a limiter on the mounted base and/or the design foam. The limiter in the non-design surface side of the design foam restricts physical displacement resulting from applied external pressure. The mounted base, the design foam, and the limiter define a predetermined volume space. The contact detecting device detects the external pressure applied on the design foam defining the volume space through a sensor detecting the physical variation of the volume space.

The mounted base may be formed of a synthetic resin foam, a rubber foam, or non-foam solid material, provided it has a predetermined shape. For example, the mounted base corresponds to the exterior of a robot, such as a humanoid robot. In particular, the mounted base made of non-foam solid material allows applied external pressure to vary the volume space only. This yields a larger detection signal.

The design foam is bonded to the mounted base and covers it. The design foam is formed of a synthetic resin foam with a predetermined shape or a rubber foam with a predetermined shape. The design foam may be preferably formed of a so-called closed-cell foam to prevent the leakage of fluid such as air.

The limiter may be disposed in the inside or the non-design surface side of the design foam with a predetermined shape. The limiter is formed of a material that is the same as the synthetic resin foam or the rubber foam and is integrally formed with the synthetic resin foam or the rubber foam. Alternatively, the limiter is formed of a material that is different from the synthetic resin foam or the rubber foam. The limiter, which is integrated with the synthetic resin foam or the rubber foam, may have an air passage or a communication passage for pressure transmission. The limiter is disposed on the mounted base or the design foam. Alternatively, the limiter has one end disposed on the mounted base and the other end disposed on the design foam. The limiter may be integrally formed with the mounted base or the design foam.

The predetermined volume space, which is defined by the mounted base, the design foam, and the limiter, provides physical variation resulting from external pressure applied to the volume space. This physical variation of the volume space is detected by the sensor.

The sensor is required to detect the external pressure applied to the volume space through the determination of the physical variation of the volume space. The sensor typically determines flow rate variation, flow velocity variation, or volume variation.

The sensor detecting the physical variation of the volume space, in which air fails to leak to outside, determines physical variation in air pressure, air flow, air flow velocity, air flow rate, or the like. The physical variation results from variation in strain or capacitance in accordance with variation in pressure including contact pressure or air pressure. As the sensor, commercial micro flow censors (such as D6F-V03A1 from OMRON Corporation), so-called "MEMS flow sensor", "MEMS flow rate sensor", or "velocity sensor", can be employed. Such micro flow sensors permit air flow. Any commercial sensors that are so-called "MEMS flow sensor", "MEMS flow rate sensor", or "velocity sensor" can be used in principle. The inventors used the D6F-V03A1 from OMRON Corporation for smaller contact detecting device. Other than the commercial product of OMRON Corporation, the products of Keyence Corporation, Aichi Tokei Denki Co., Ltd, Yamatake Corporation, and ASK Co., Ltd was used as flow sensor. It has been confirmed that these products can be used as the flow sensor in principle.

The sensor SEN includes a circuit to detect the external pressure applied to the volume space through the determination of variation in air pressure, air flow, air flow velocity, air flow rate, air transfer, or the like as the physical variation of the volume space. Specifically, the circuit detects the external pressure applied to the volume space through the determination of the physical variation of the volume space and then determines whether the physical variation exceeds a certain threshold. Thus, the circuit has two signals, a normality or an abnormality as signal detection output. For example, the sensor output signal is digitized by the analog-to-digital converter of a microprocessor and then the digitized signal is output from the microprocessor.

In the contact detecting device according to claim 2 of the present invention, the limiter, which is in the inside of the design foam or in the non-design surface side of the design foam, has a particular shape. The limiter with a particular shape supports the mounted base in the non-design surface side of the synthetic resin foam or the rubber foam. This limiter includes a cylinder, column, prism, polygon tube, or rib.

Thus, the limiter includes a cylinder, column, prism, polygon tube, or rib. The cylinder, column, prism, polygon tube, or rib may or may not be configured to vary in the shape in accordance with applied external pressure. The limiter is not necessarily to be seen from the design surface.

In the contact detecting device according to claim 3 of the present invention, the limiter has circular cut-outs or polygonal cut-outs. The limiter having circular or polygonal cut-outs allows air flow. This enables the design surface of the design foam to be free from stress.

In the contact detecting device according to claim 4 of the present invention, the limiter, which is in the inside of the design foam, is formed of a flexible tape with a uniform thickness. The flexible tape has a cylinder, column, prism, polygon tube, or rib. Thus, the limiter can be arranged linearly. This enables a predetermined line to have higher resilience. The flexible tape with a uniform thickness has a cylinder, column, prism, polygon tube, or rib at the tape surface or the predetermined surface with square or rectangle.

Effects of Invention

A contact detecting device according to claim 1 of the present invention includes a mounted base with a predetermined shape, a design foam that is bonded to the mounted base and covers the mounted base, and a limiter inside the design foam or in the non-design surface side of the design foam. The design foam is formed of a synthetic resin foam with a predetermined shape or a rubber foam with a predetermined shape. The limiter is integrally formed with the synthetic resin foam and/or the rubber foam, or mounted on the synthetic resin foam and/or the rubber foam. The limiter restricts physical displacement resulting from applied external pressure. The mounted base, the design foam, and the limiter define a predetermined volume space. The contact detecting device detects the external pressure applied to the volume space through a sensor determining the physical variation of the volume space.

The design foam with a predetermined shape is mounted on the mounted base and converts the mounted base. The limiter, which is integrally formed with the synthetic resin foam and/or the rubber foam, is disposed in the non-design surface side of the design foam. The design foam, the mounted base, and the limiter define the predetermined volume space. The predetermined volume space, which is enclosed except where air for the sensor inflows or outflows, is subjected to pressure. Thus, the contact detecting device is used in a particular exterior such as a robot exterior. The limiter, which is integrated with the synthetic resin foam or the rubber foam, enables the design foam to have a fixed depression and physical variation no matter where external pressure is applied on the design surface of the foamed design. A device having different intervals between the mounted base and the non-design surface formed into, for example, an inverted U-shape, might vary in curve and the physical displacement of the design foam in accordance with pressed position of the design surface of the design foam. However, the limiter, which is integrated with the synthetic resin foam or rubber foam, prevents variation in the curve and the physical displacement. The limiter may include a cylinder, column, prism, polygon tube, or rib, or the limiter may have circular or polygonal cut-outs. Alternatively, the limiter may be formed of a flexible tape with a uniform thickness. This flexible tape may have a cylinder, column, prism, polygon tube, or rib. The limiter is attached to the mounted base and/or the design foam, or integrated with them in accordance with application use.

The design foam is bonded to the mounted base with a predetermined shape and covers it. The design foam has the limiter integrated with it. These design foam, the mounted base, and the limiter define the predetermined volume space. The sensor detects the external pressure applied to the volume space through the determination of the physical variation of the volume space. The sensor outputs the detection information as electrical signal. No matter where a certain external pressure is applied to, the sensor has less variation in the output. Thus, the sensor provides fixed output in response to the pressure applied to the volume space.

The design foam, which is mounted on the mounted base with a predetermined shape and covers it, has a design surface. Since external pressure is applied to part of the design foam, the design surface is free from, for example, stress. Additionally, the limiter is disposed between the design foam and the mounted base. This allows the design surface to have any resilience. The non-design surface of the design foam is displaced between an acceptable clearance $\delta=0.5$ to 15 mm. Thus, the design foam returns to normal without having stress and the degradation of the design surface. The acceptable clearance may be above 15 mm. However, the acceptable clearance is preferably between 0.5 to 15 mm for intended visual appearance.

The contact detecting device according to an embodiment of the present invention includes the limiter that can be formed by injection-molding, if desired. This reduces the device cost. According to the contact detecting device of an embodiment of the present invention, the physical variation can be changed as desired by varying the pitch between the limiters or the height of the limiter. This allows the output value of the sensor SEN, which detects the physical variation, to be set as desired.

Thus, the limiter, which is integral with or attached to the synthetic resin foam and/or the rubber foam, restricts physical displacement resulting from applied external pressure. This limiter can determine any response to the applied pressure.

In the contact detecting device according to claim 2 of the present invention, the limiter, which has a predetermined shape and supports the mounted base in claim 1, includes a cylinder, column, prism, polygon tube, or rib.

Thus, in addition to the effect achieved in the claim 1, the sensor, which detects the physical variation of the volume space subjected to external pressure and outputs the detection information as electrical signal, has less variation in the output according to pressed position. The cylinder, column, prism, polygon tube, and rib are used as prop to reduce the curvature of the design foam within a predetermined range. The cylinder, column, prism, polygon tube, and rib that stand vertically to a plane can divide applied external pressure. Thus, the pressure applied to the volume space allows the fixed output of the sensor.

In the contact detecting device according to claim 3 of the present invention, the limiter, which has a predetermined shape and supports the mounted base in claim 1 or claim 2, has circular cut-outs or polygonal cut-outs. The cut-outs with circle or polygon including triangle acts as air pathway for air flow. Additionally, the cut-outs with polygon including triangle allow any air flow resistance to be set. Thus, the design surface of the design foam with a predetermined shape has intended visual appearance.

The limiter with a predetermined shape has circular cut-outs or polygonal cut-outs. The cut-outs with circle or polygon allow air flow near the mounted base side. Thus, the air fails to cool down rapidly and fails to create water drops.

In the contact detecting device according to claim 4 of the present invention, the limiter, which has a predetermined shape and supports the mounted base, is formed of a flexible tape with a uniform thickness. This flexible tape has a cylinder, column, prism, polygon tube, or rib. Thus, in addition to the effects achieved in the claim 1 or claim 2, the used of the sticking flexible tape, which has a uniform thickness and has a cylinder, column, prism, polygon tube, or rib, allows continuous variation in the resilience.

In particular, the flexible tape adhered on the mounted base acts as part of the mounted base. The design foam is then mounted on the mounted base with the flexible tape.

BRIEF DESCRIPTION OF DRAWINGS

FIGS. 16A, 16B, 16C, 16D, 16E, and 16F are summaries of a contact detecting device according to the embodiments of the present invention. Individual FIGS. 16A, 16B, 16C, 16D, 16E, and 16F are a principle cross-sectional view of a contact detecting device according to an embodiment of the present invention.

MODE(S) FOR CARRYING OUT THE INVENTION

Figure 1:
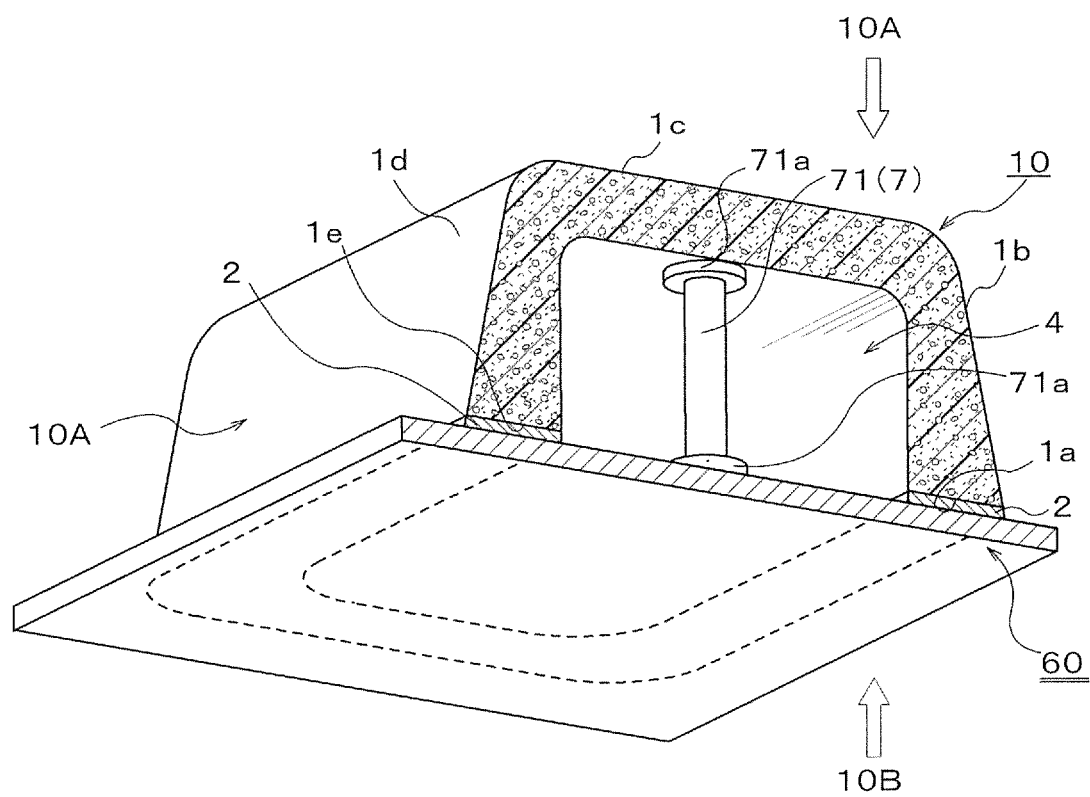
FIG. 1 is a perspective view that includes a main cross-section and illustrates principle of a contact detecting device according to an embodiment of the present invention.

Embodiments of the present invention are described hereafter based on drawings. In embodiments of the present invention, the same marks and the same codes shown in the drawings mean the same or equivalent function parts. Thus, overlapped description thereof has been omitted here.

[Embodiment]

FIG. 1 to FIG. 10 show respective embodiments of a contact detecting device in accordance with the present invention. A mounted base 60 with a predetermined shape is a member of a humanoid robot 50. The mounted base 60 is used as a protector incorporating electronic components. The mounted base 60 is formed of, for example, a solid thermoplastic synthetic resin plate, a foam thermoplastic synthetic resin plate, or a metal plate made of aluminum, stainless steel, iron, copper, or brass. The mounted base 60 is preferably formed of metal or solid resin, which is harder than foam thermoplastic resin and hard to deform.

Joining means 2 is an adhesive layer or a double-sided tape, or specifically a synthetic resin adhesive that is available commercially or a known double-sided tape. The joining means 2 is disposed on the end surfaces of a design foam 10 with a particular shape, or specifically on bonding surfaces 1*a* and 1*e*, which is closer to the mounted base 60. Alternatively, the adhesive layer or the double-sided tape as the joining means 2 may be directly disposed on the mounted base 60, or specifically on bonding surfaces corresponding the bonding surfaces 1*a* and 1*e*. The joining means 2 according to an embodiment is required to seal the design foam 10 and the mounted base 60 to allow a space to be closed. The space is defined by the design foam 10 and the mounted base 60, or specifically by the design foam 10, the mounted base 60, and a limiter 7. Thus, the joining means 2 may be a synthetic resin adhesive that is available commercially or a known double-sided tape.

Other embodiments are similar.

The design foam 10 has a design surface including a side surface 1*b*, a side surface 1*d*, and a top outer surface 1*c*. Thus, the side surface 1*b*, the side surface 1*d*, and the outer surface 1*c* provided a non-design surface side. As the non-design surface, surfaces perpendicular to the mounted base 60 of a robot or the like, such as the inner surfaces of the other side of the side surfaces 1*b* and 1*d*, may be eliminated. Under downward pressure, the top outer surface 1*c* of the design foam 10 may be deeply sunk or dent in the middle.

However, a cylinder 71 as the limiter 7 that stands on the middle of the other side of the outer surface 1*c* restricts the perpendicular displacement of the outer surface 1*c* subjected to downward pressure illustrated in FIG. 1. Thus, the perpendicular displacement is limited by an end of the limiter 7. The cylinder 71 has a bottom surface with a flange 72*a* or/and a top surface with a flange 72a. The bottom surface of the cylinder 71 is bonded to the mounted base 60 with the joining means 2, such as a known synthetic resin adhesive or a double-sided tape that is available commercially. The top surface of the cylinder 71 also has the flange 72a. The cylinder 71 having a sharp at the top surface would scratch or damage the inner surface of the other side of the outer surface 1c. Thus, the cylinder 71 preferably has a curve or the flat of the flange 72a (specifically, a flat surface perpendicular to the axis of the flange 72a) at the top surface. The cylinder 71 may have a flange 71a or a horizontal cut plane at the top surface. The cylinder 71 may or may not be bonded to the non-design surface of the design foam 10.

The flange 71a, which is a widened area at the bottom surface or/and the top surface of the cylinder 71, prevents the concentration of applied pressure and enables the applied pressure to be dispersed. This allows the mounted base 60 and the design foam 10 to be free from stress. The cylinder 71 may made of foam resin or solid resin.

The cylinder 71 as the limiter 7 stands at the ½ position (the center in the figure) of the outer surface 1c of the design foam 10. Thus, when external pressure is applied to the outer surface 1c of the design foam 10, the design foam 10 is deformed, sunk, or dented in acceptable clearance δ and is reduced in the volume by the pressure applied to the position out of the limiter 7. This variation in the volume causes air with pressure to flow into a sensor SEN, which is not shown. Thus, the sensor SEN detects the information of the pressure applied on the design foam 10 and outputs them.

If the design foam 10 does not have any standing cylinder 71 as the limiter 7, the pressure applied to the outer surface 1c of the design foam 10 may stretch or contract the design surface and put stress on the design surface. When the external pressure is released, the resilience of the design foam 10 allows the stress on the outer surface 1c to be released. The variation in the volume causes air with pressure to flow into the sensor SEN, which is not shown. Thus, the detection output of the sensor SEN is related to the pressure applied on the design foam 10.

Figure 2:
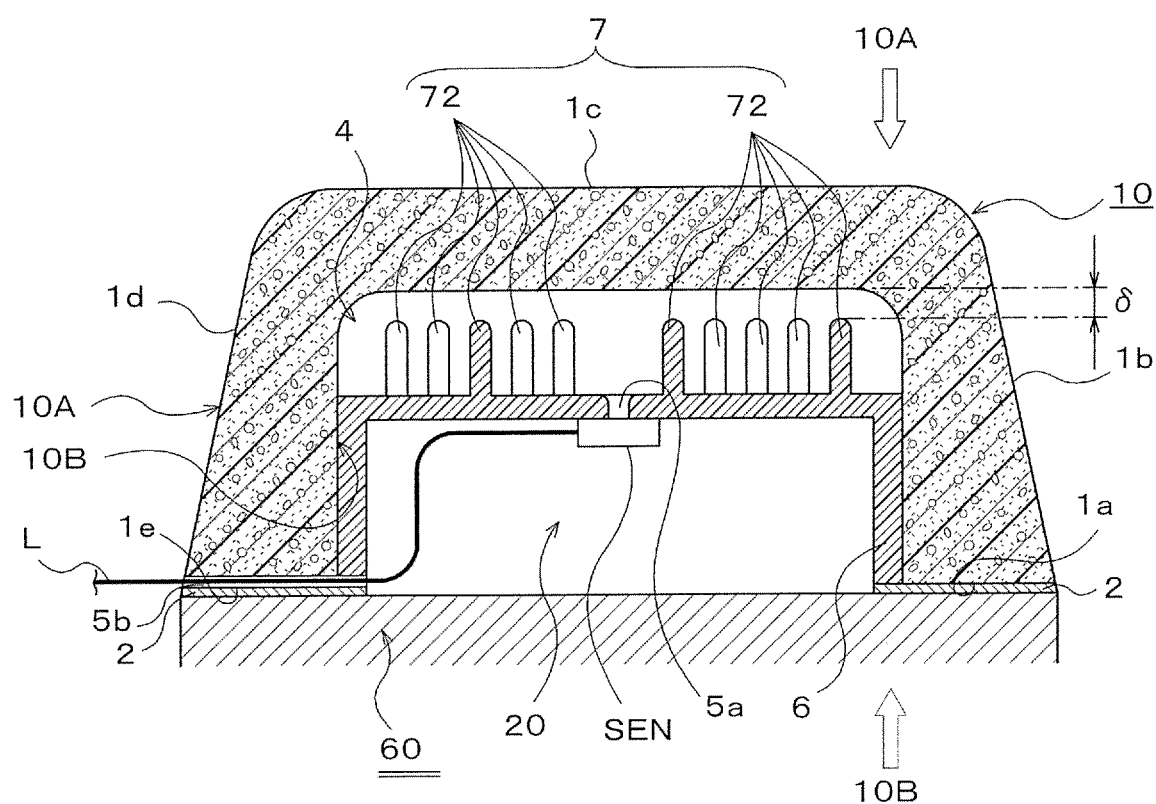
FIG. 2 is a principle cross-sectional view illustrating a contact detecting according to an embodiment of the present invention.

The limiter 7 of the embodiments of FIGS. 1 and 2 consists of the cylinder(s) 71. The limiter 7 may be disposed on the design foam 10 or the limiter 7 may be disposed on the mounted base 60.

The standing cylinder 71 as the limiter 7 prevents the stretch of the design foam 10 and reduces the physical displacement of the design foam 10. The amount of the physical displacement can be modified by change of the distribution density or the height of the limiter 7 as necessary. Thus, the output value of the sensor SEN, which detects the amount of the physical displacement, can be set as desired.

The contact detecting device according to the embodiments of the present invention can be formed by injection-molding, if desired. This can reduce the device cost.

The cylinder 71 may have a top end unattached to the design foam 10: that is, the cylinder 71 may have a free end at the top end. The top end of the cylinder 71 may be level with the inner surface of the other side of the outer surface 1c. Alternatively, the top surface of the cylinder 71 may be spaced from the inner surface of the other side of the outer surface 1c. That is, the top surface of the cylinder 71, which limits the displacement of the inner surface of the other side of the outer surface 1c as the limiter 7, and the inner surface of the other side of the outer surface 1c may define acceptable clearance δ=0.5 to 15 mm (referring to FIG. 2), allowing the outer surface 1c to be sunk, or dented between the acceptable clearance δ=0.5 to 15 mm. This can restrict applied external pressure, thus preventing the design foam 10 from having large tension, degraded design, and stretch at the surface.

Thus, the gap between the top end of the cylinder 71 and the inner surface of the other side of the outer surface 1c is the acceptable clearance δ that is 0.5 to 15 mm. Alternatively, the acceptable clearance δ is determined by referring to, for example, the thickness or the shape of the design foam 10, or the interval between the cylinders 71.

FIG. 2 shows an embodiment of the contact detecting device in accordance with the present invention. A mounted base 60 with a predetermined shape is formed of, for example, a solid thermoplastic synthetic resin plate, a foam thermoplastic synthetic resin plate, or a metal plate made of aluminum, stainless steel, iron, copper, or brass, as with the previous embodiment of FIG. 1. Joining means 2 is an adhesive layer or a double-sided tape, or specifically a synthetic resin adhesive that is available commercially or a known double-sided tape. The joining means 2 is disposed on the surfaces of a design foam 10 with a particular shape, or specifically on bonding surfaces 1a and 1e, which is closer to the mounted base 60. Alternatively, the joining means 2 is disposed on the bonding surfaces 1a and 1e of the mounted base 60.

As with the previous embodiment of FIG. 1, the design foam 10 has a design surface 10A including a side surface 1b, a side surface 1d, and an outer surface 1c. Thus, the side surface 1b, the side surface 1d, and the outer surface 1c provide a non-design surface side. As the non-design surface, surfaces perpendicular or nearly perpendicular to the mounted base 60, such as the inner surface of the other side of the side surfaces 1b and 1d, may be eliminated. The surfaces nearly perpendicular to the mounted base 60 includes the surfaces inclined at ±20 or less degrees angle to perpendicularity. When external pressure is applied to the outer surface 1c downward, the inclined surfaces, which are inclined at ±20 or less degrees angle to the perpendicularity perpendicular to the mounted base 60, fail to be deformed while the outer surface 1c is deformed at the middle.

Again, the standing cylinder(s) 71 as the limiter 7 limit the amount of the perpendicular displacement of the outer surface 1c, to which is subjected to downward external pressure at the middle. This reduces variation in physically detected value.

In the embodiment shown in FIG. 2, a cylinder 71 has a top surface with a flange 71a and a bottom surface with a flange 71a. Only the flange 71a of the bottom surface of the cylinder 71 is bonded to the mounted base 60 with the joining means 2, such as known synthetic resin adhesive or a double-sided tape that is available commercially. The flange 71a of the top surface of the cylinder 71 is unbonded to the bottom surface of the cylinder 71 although the flange 71a is in contact with the bottom surface.

The limiter 7 is integrated with the mounted base 60 or the design foam 10, or the limiter 7 is attached to the mounted base 60 or the design foam 10. Alternatively, the limiter 7 may be integrated with the mounted base 60 and the design foam 10, or the limiter 7 may be attached to the mounted base 60 and the design foam 10.

In the present embodiment, the top surface of the cylinder 71 has the flange 71a and the bottom surface of the cylinder 71 also has the flange 71a. Only the flange 71a of the bottom surface of the cylinder 71 is bonded to the mounted base 60 with the joining means 2. The cylinder 71 is required to be in contact with one of the mounted base 60 and the design foam 10. It is preferred that the top end of the cylinder 71 is spaced from the inner surface of the other side of the outer surface 1c by the acceptable clearance δ=0.5 to 15 mm, from standpoint of surface curves.

In the present embodiment, the cylinder 71 has the flange 71a at the top surface. The cylinder 71 having a sharp at the top surface would scratch or damage the inner surface of the other side of the outer surface 1c. Thus, the cylinder 71 preferably has a curve or the flat of the flange 71a at the top surface. A cylinder, a column, a prism, a polygon tube, or a rib, which is a reinforcement in a complex structure, is preferably employed.

The cylinder 71 is substantially cylindrical and hollow. The term, cylinder 71 includes a hollow cone and a hollow circular truncated cone. The column 72 is substantially cylindrical and solid. The term, column 72 includes cone and circular truncated cone. The term, prism or the polygon tube includes hollow or solid cylinder, column, cone, and circular truncated cone. The design foam 10 may have a frame, such as a square frame, in the non-design surface 10B side. The frame has circular cut-outs 90 or polygon cut-outs to allow air flow. In certain embodiments, the term, circular cut-outs 90 includes circular cut-outs, polygon cut-outs, and semi-circular cut-outs.

The top surface of the cylinder 71 may abut on the inner surface of the other side of the outer surface 1c, as described above. Alternatively, the top surface of the cylinder 71 and the inner surface of the other side of the outer surface 1c may define the acceptable clearance δ=0.5 to 15 mm, as described above. That is, the top surface of the cylinder 71, which limits the displacement of the inner surface of the other side of the outer surface 1c as the limiter 7, and the inner surface of the other side of the outer surface 1c may define acceptable clearance δ=0.5 to 15 mm, allowing the outer surface 1c to be sunk or dented between the acceptable clearance δ=0.5 to 15 mm. This can restrict applied external pressure.

Even if there is the acceptable clearance δ=0.5 to 15 mm, the physically variation is reliably detected and the outer surface 1c of the design foam 10 has intended visual appearance.

Thus, the limiter 7, which is disposed between the design foam 10 and the mounted base 60, is placed at the acceptable clearance δ=0.5 to 15 mm from the design foam 10 or the mounted base 60. The limiter 7 is placed at from an inner surface. This allows the design foam 10 to be free from stress and keep its visual appearance.

In the present embodiment, the design foam 10 shown in FIG. 2 has the design surface 10A including the side surface 1b, the side surface 1d, and the outer surface 1c. The design foam 10 has the bonding surfaces 1a and 1b with adhesive, to which the mounted base 60 is bonded. The design foam 10 may have the design surface 10A consisting only of the outer surface 1c. This occurs when the design foam 10 has thin side surfaces in the design surface 10A, or the design foam 10 has no side surface, instead, the mounted base 60 has the side surfaces. At least part of the design surface 10A of the design foam 10 provides the non-design surface 10B side. In any case, the design foam 10 and the mounted base 60 are required to be sealed.

A volume space 4 between the design foam 10 and the mounted base 60 is closed. Thus, external pressure applied on the design foam 10 causes the volume space 4 to have stress in accordance with the applied pressure and to vary in the volume and the internal pressure. This variation in the volume of the volume space 4 causes air with increased pressure to flow into a sensor SEN. Thus, the pressure applied on the design foam 10 is detected through the sensor SEN.

The employment of a microflowsensor (D6F-VO3A1 from OMRON Corporation) on the market as the sensor SEN requires air flow in the sensor SEN. Thus, there is provided a guide passage 5b, which a lead line L passes through, to cause volume variation of the volume space 4. The guide passage 5b allows air to pass from an auxiliary space 20 shown in FIG. 2 to the outside. Thus, the guide passage 5b, which a lead line L passes through, causes air flow. When external pressure applied to the volume space 4 between the design foam 10 and the mounted base 60 is relieved, the air reversely passes through the sensor SEN while the volume space 4 returns to the original. The external pressure is not applied to the sensor SEN, but the external pressure is applied to the volume space 4. However, only the sensor SEN may be conventionally described hereinafter.

Figure 3:
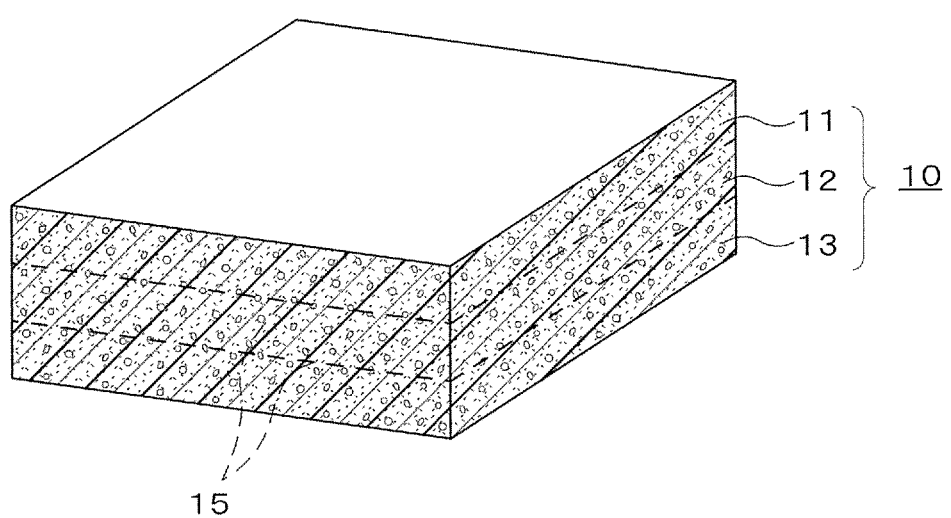
FIG. 3 is a diagrammatic view of the cross-section of a multilayer design foam of a contact detecting device according to an embodiment of the present invention.

The design foam 10 of the contact detecting device according to an embodiment is formed of at least one synthetic resin foam 11, 12, 13 with a predetermined shape as shown in FIG. 3. The synthetic resin foam(s) 11, 12, 13 is a piece of thermoplastic resin, or two or more pieces of thermoplastic resin that are stacked and bonded together using adhesive 15. The synthetic resin form(s) 11, 12, 13, which forms the design foam 10, has a predetermined hardness to allow volume variation of the volume space 4. The design foam 10 may be a closed-cell foam, which includes non-interconnected cells. Alternatively, the design foam 10 may be an open-cell foam, which includes interconnected cells. Preferably, the design foam 10 is a closed-cell foam, which has high flexibility and resilience to prevent air leakage. The design foam 10 has an expansion ratio of about 10 to 50 times. The design foam 10 preferably has sponge hardness (JIS-k-6253) of 10 to 50, more preferably, 15 to 45. Preferred sponge hardness may differ in accordance with the components.

As shown in FIG. 3, the present inventors employed three pieces of standardized polyethylene, which is commercially available, as the synthetic resin foam(s) 11, 12, 13. Individual synthetic resin foam 11, 12, 13 with polyethylene is a single foam with standardized dimensions. Individual synthetic resin foam 11, 12, 13 has a skin layer with high density at the surface. To provide products having a thickness of above 50 mm in the present example, three standardized synthetic resin foams 11, 12, 13 are stacked and bonded together with rubber-based adhesive as the adhesive 15. Individual synthetic resin foam 11, 12, 13 has the rubber-based adhesive at the bonding surface(s) with the skin layer(s).

The rubber-based adhesive 15, which is, for example, rubber cement (in non-toluene can from Marusue Oil Co., Ltd.) or rubber cement bond (G700X7 from Konishi Co., Ltd.), is thinly spread on the surface(s) to be bonded, followed by drying. The surface(s) with the adhesive is then pressed so that the facing surfaces with the adhesive are bonded together. The bond (G700X7 from Konishi Co., Ltd.) as the rubber-based adhesive 15 includes cyclohexane, n-heptane, and acetone as principal components.

The rubber-based adhesive 15 is spread as thin as possible so that the rubber-based adhesive 15 is invisible. The rubber-based adhesive 15 is only required to achieve joining. As the rubber cement used herein as the rubber-based adhesive 15, the same synthetic resin including polyethylene as the synthetic resin foam 11, 12, 13 mounted the base may be employed.

Figure 4:
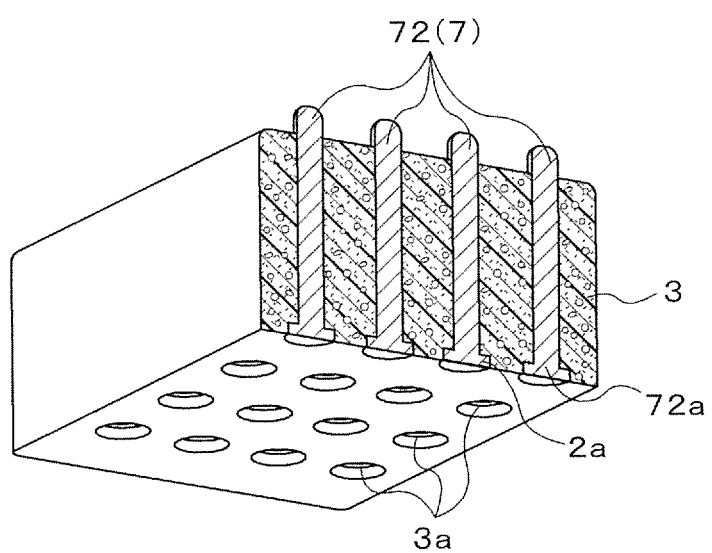
FIG. 4 is a diagrammatic view of the cross-section of a supporter of a contact detecting device according to an embodiment of the present invention.

In FIG. 4, a limiter 7, which is formed of synthetic resin foam or relatively resilient material, is disposed in a supporter 3 with high resilience, preventing the limiter 7 from tilting or bending.

That is, the supporter 3 with a synthetic resin foam supports the standing limiter 7 to prevent the limiter(s) 7 from leaning on each other or falling down. The leaning on or falling down of the limiter(s) 7 may occur when external pressure is applied to the top end of the limiter 7 during assembly and this causes the decrease or the loss of joining means 2 such as adhesive on the limiter 7, or tilt-fixed of the limiter 7.

The contact detecting device according to an embodiment include columns 72 of FIG. 4 instead of the columns 72 of FIG. 2.

Each column 72 as the limiter 7 has a flange 72a at its bottom surface. Only one end of each column 72 is fixed to a hole using the joining means 2a. This embodiment employs a closed-cell foam including non-interconnected cells. Thus, the supporter 3 is deformed by pressure from the design foam 10. The deformation amount of the supporter 3, which yields to pressure from the design foam 10, is determined and output through the sensor SEN. Each column 72 has the flange 72a at its bottom surface. However, the flange 72a may be omitted and each column 72 may be shaped in, for example, a frustum, a circular truncated, or others in some embodiments.

The supporter 3 formed of an open-cell foam is disposed in the volume space 4 enclosed with a closed-cell foam. The columns 72 as the limiter 7, which are disposed at predetermined intervals, are internally arranged in the predetermined range of the design foam 10. The outer surface 1c of the design foam 10 is sunk or dented until it reaches the end of the limiter 7 by a predetermined pressure applied on the outer surface 1c. Thus, the design foam 10, which is formed of a closed-cell foam including non-interconnected cells and has airtightness, allows the deformation amount of the supporter 3 to be communicated to the sensor SEN. The supporter 3 of FIG. 4 is now deformed or sunk until it reaches the end of the limiter 7. Thus, the deformation amount of the supporter 3 is communicated to the sensor SEN.

The flange 72a of the bottom surface of each column 72 is disposed in a large diameter hole 3a.

Figure 5A:
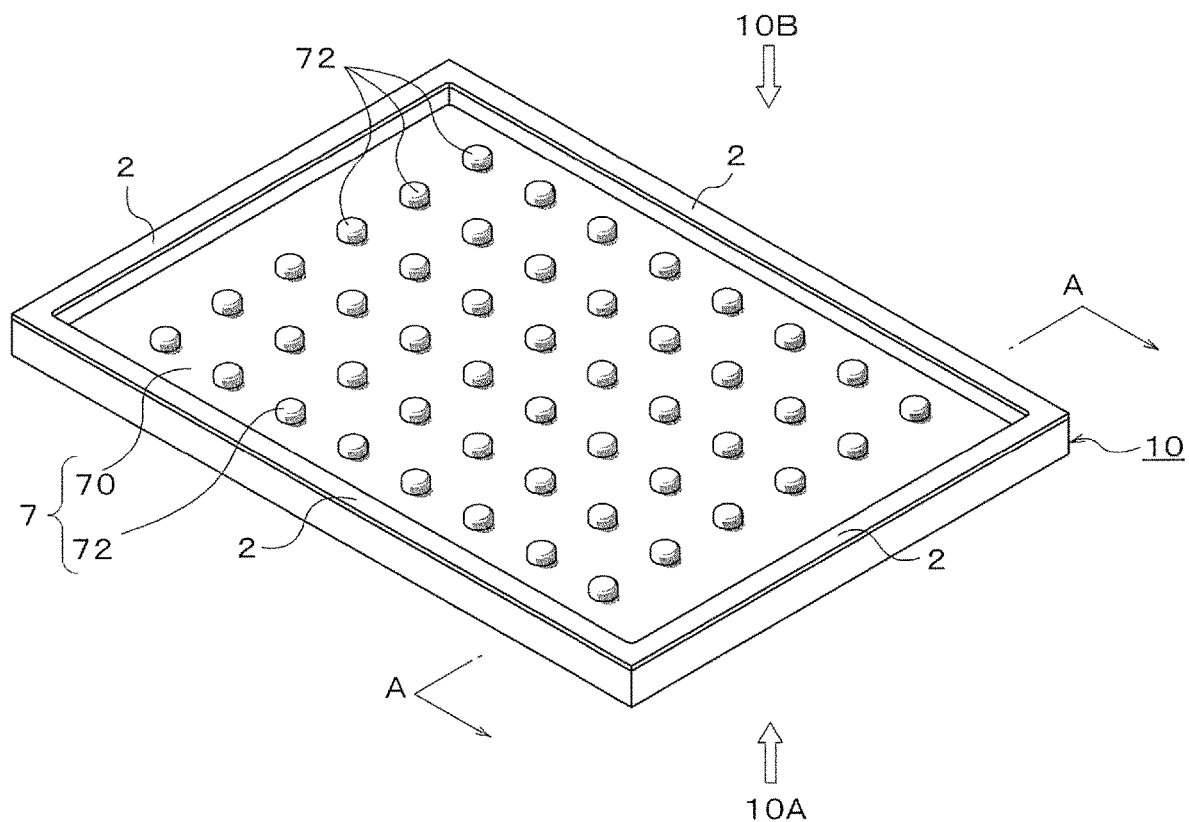
FIG. 5A is a principle perspective view of the design foam viewed from the non-design surface side of the design foam of a contact detecting device according to an embodiment of the present invention.
Figure 5B:
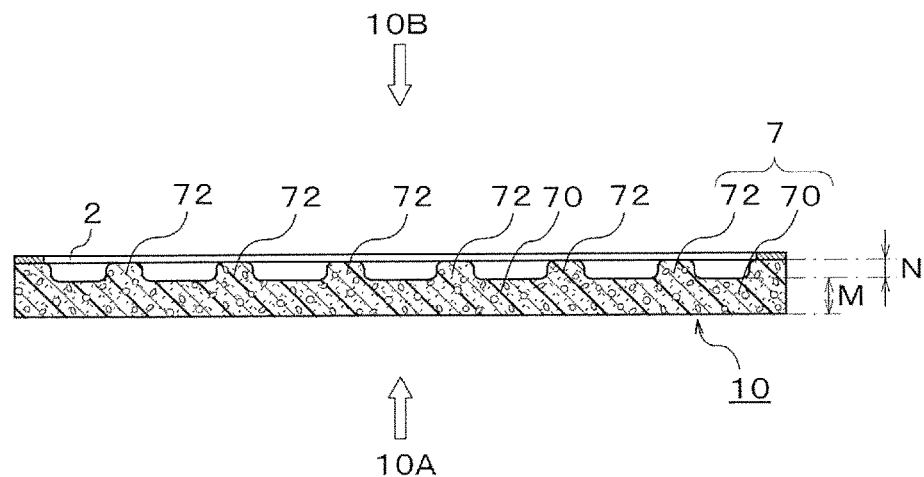
FIG. 5B is a cross-sectional view of the design foam taken along the line A A of FIG. 5A.

In FIGS. 5A and 5B, the limiter 7 includes a common design base 70 and columns 72 formed on the common design base 70. The columns 72 are integrally formed with the design base 70. In some embodiments, the limiter 7 may include hollow cylinders 71 instead of the solid columns 72. Alternatively, the limiter 7 may have circular cut-outs 90 or polygon cut-outs, described below. The circular cut-outs 90 or polygon cut-outs may be formed in a frame such as a square frame arranged in the non-design surface 10B side of the design foam 10.

In an embodiment shown in FIGS. 5A and 5B, the limiter 7 includes the design base 70 and the columns 72 that are integrally and continuously formed with the design base 70.

Thus, the contact detecting device includes the mounted base 60 with a predetermined shape and the design foam 10 that is bonded to the mounted base 60 and covers it. The design foam 10 is formed of a synthetic resin foam with a predetermined shape or a rubber foam with a predetermined shape. The contact detecting device further includes the limiter 7 disposed on the mounted base 60, the design foam 10, or both. The limiter 7, which is disposed in the non-design surface 10B side of the design foam 10, restricts physical displacement resulting from applied external pressure. The contact detecting device further includes the predetermined volume space 20 defined by the mounted base 60, the design foam 10, and the limiter 7, which end(s) is integrated with the mounted base 60, the design foam 10, or both. The contact detecting device further includes the sensor SEN that detects the external pressure applied to the volume space 20 through the determination of physical variation of the volume space 20.

Figure 6:
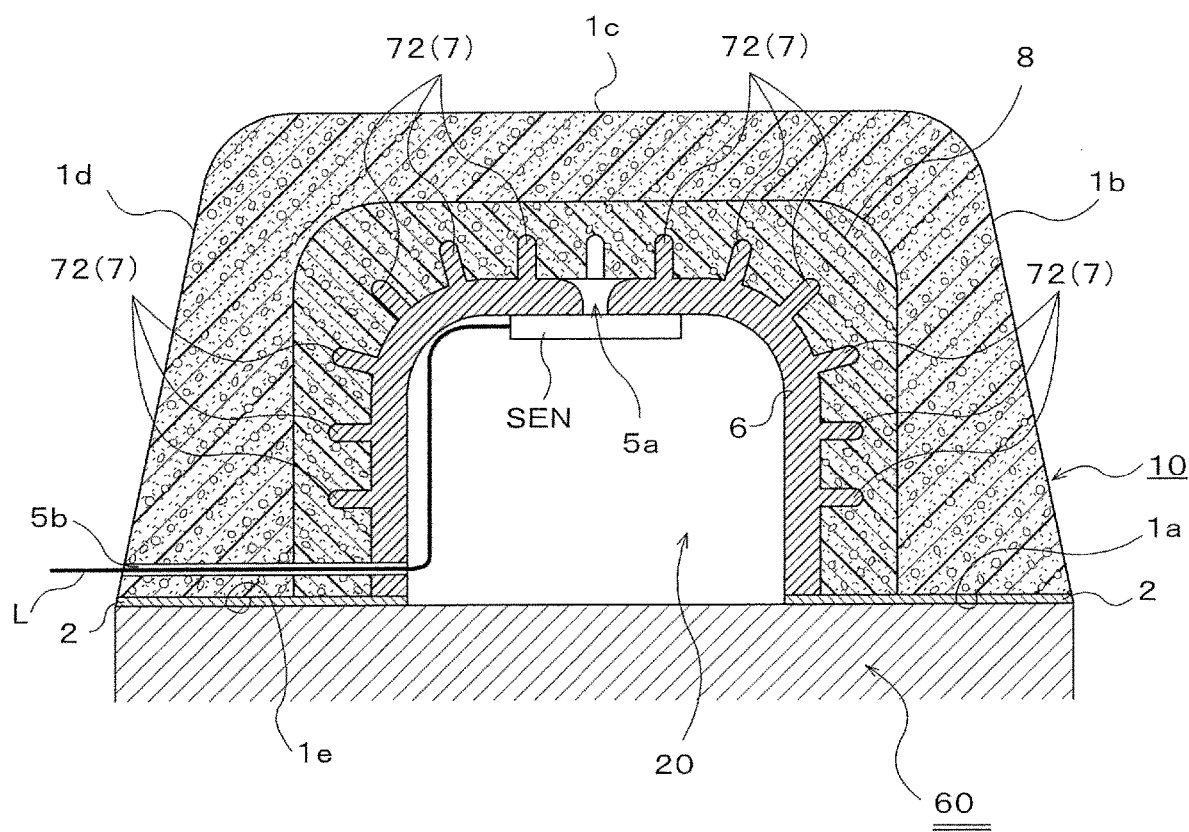
FIG. 6 is a diagrammatic view of the cross-section of a contact detecting device including a limiter integrated with a design foam according to an embodiment of the present invention.

In FIG. 6, a volume varying body 8 is employed as a resilient structure that allows the volume space, in which a limiter 7 with a synthetic resin foam is disposed, to vary in the volume. The volume varying body 8 is formed of an open-cell foam, which includes interconnected cells. Thus, under pressure, the volume varying body 8 varies in the volume. This causes air to pass through the sensor SEN via a guide passage 5a. Here, columns 72 as the limiter 7 are disposed on the inner frame 6. Under pressure, the design foam 10 that is formed of a closed-cell foam including non-interconnecting cells allows the volume varying body 8 that is formed of an open-cell foam including interconnected cells to be deformed. The volume variation of the volume varying body 8 causes air to flow into an auxiliary space 20 via the guide passage 5a and the guide passage 5b.

As described above, the contact detecting device according to this embodiment includes the mounted base 60 with a predetermined shape and the design foam 10 that is bonded to the mounted base 60 and covers it. The design foam 10 is formed of a synthetic resin foam with a predetermined shape or a rubber foam with a predetermined shape. The contact detecting device further includes the limiter 7 (7a) disposed on the mounted base 60, the design foam 10, or both through the inner frame 6. The limiter 7 (7a), which is disposed in the non-design surface 10B side of the design foam 10, restricts physical displacement resulting from applied external pressure. The limiter 7 (7a) is formed of the cylinder(s) 72, the column(s) 72, prism(s) with hollow or solid, or rib(s). The contact detecting device further includes the volume varying body 8 as the predetermined volume space 4 defined by the mounted base 60, the design foam 10, and the limiter 7 (7a), which end(s) is integrated with the mounted base 60, the design foam 10, or both. The contact detecting device further includes the sensor SEN that detects the external pressure applied on the volume varying body 8 as the volume space 4 through the determination of the physical variation of the volume varying body 7 as the volume space 4.

In the embodiment of FIG. 6, the cylinders 72 as the limiter 7 are disposed in the volume varying body 8 as the volume space 4. The inner frame 6 of FIG. 6 is similar to that of FIG. 2. In FIG. 6, the inner frame 6 and the limiter 7 formed of the cylinders 72 are integrally formed together and have same material. The cylinders 72 arranged radially as the limiter 7 are less easily released from two split molds when being formed by molding. Thus, the cylinders 72 are preferably formed as short as possible. The limiter 7 of the present embodiment includes the inner frame 6 and the cylinders 72.

The contact detecting device according to an embodiment is generally described in more detail below.

The design foam 10 is mounted on the cover of a robot including a humanoid robot or the cover of an apparatus housing. Such a covers is typically formed of an aluminum plate, stainless plate, iron plate, copper plate, or brass plate. Alternatively, such a cover is made of synthetic resin including foam synthetic resin. A cover made of synthetic resin may be formed by injection molding mainly. The mounted base 60, which is injection molded, is typically formed of one block of thermoplastic resin. In the contact detecting device of the present embodiment, an example in which the design foam 10 is formed of one block including injection molded one block is described As the foam synthetic resin, polyurethane (PUR), polystyrene (PS), polyolefin, which is mainly polyethylene (PE) or polypropylene (PP), or foam resin such as phenol resin (PF), polyvinyl chloride (PVC), urea resin (UF), silicone (SI), polyimide (PI), or melamine resin (MF) may be employed in embodiments. As the synthetic resin foam, an open-cell foam including interconnected cells may be used or a closed-cell foam including non-interconnected cells may be used. Preferably, a closed-cell foam including non-interconnected cells is used to prevent air in the volume space 4 from leaking through the design foam 10 and the mounted base 60 to outside.

The inner frame 6 with a box-shape shown in FIG. 2 and FIG. 6 is a box frame that is injection-molded. The inner frame 6 is stably installed on a predetermined position. This inner frame 6 leads air pressure or air flow to the inlet of the sensor SEN, enabling volume or pressure variation of the volume space 4 to be determined by the sensor SEN precisely. The inner flame 6 is formed into a square box shape so that the inner frame 6 fails to move to the horizontal direction and the vertical direction. This enables applied external pressure to be easily detected. The inner frame 6 defines the auxiliary space 20. The auxiliary space 20 may temporarily accommodate inflow air resulting from volume or pressure variation of the volume varying body 8. Alternatively, the auxiliary space 20 may be independent space. The pressure variation resulting from the volume variation of the volume varying body 8 allows air flow so that the auxiliary space 20 has atmospheric pressure.

The inner frame 6 with a square box shape or tunnel shape may be formed of a metal plate or a piece of molded metal.

The auxiliary space 20 is defined by an open-cell foam made of foam synthetic resin. Thus, air with pressure derived from the pressed volume varying body 8 flows into the inlet of the sensor SEN via the guide passage 5a. The auxiliary space 20 then keeps atmospheric pressure substantially. The auxiliary space 20, however, has the applied external pressure in addition to the atmospheric pressure. Thus, in principle, the auxiliary space 20 has higher air pressure than outside air. Release of pressure applied on the volume varying body 8 causes open air to flow into and fill the volume varying body 8 via the guide passage 5b and the sensor SEN.

The volume varying body 8 of FIG. 6 is formed of an open-cell foam made of foam synthetic resin. Under no pressure, the pressure of the volume varying body 8 is equal to the atmospheric pressure. As the sensor SEN, a pressure sensor and a commercial micro flow sensor (D6F-V03A1 from Omron Corporation) for detecting air flow may be used in the same way. These sensors need to allow air to pass from the volume varying body 8 to the auxiliary space 20.

The sensor SEN detects the variation of the volume varying body 8, which has a reinforcement layer (not shown) for preventing air leakage to outside. As the sensor SEN, a conventional sensor such as a sensor with a strain gauge, a sensor using a diaphragm for detection, a sensor with piezoelectric device, or a capacitance sensor may be employed.

As the sensor SEN, a SMC small pressure sensor for air pressure PSE540A was employed in one embodiment. This sensor has output voltage V that is substantially proportional to input pressure. This sensor has high sensitivity. The output of the sensor SEN has three lines: two power lines and one output signal line OUT. The output is used as a red flag signal for stopping the humanoid robot 50 suddenly in the present embodiment.

For example, the box inner frame 6 is disposed in the non-design surface 10B side and bonded to the mounted base 60 with adhesive, as shown in FIG. 2. This box inner frame 6 has the sensor SEN, which has output proportional to applied external pressure. This inner frame 6 allows pressure in the volume space 4 to be applied to the inlet of the guide passage 5a, which guides air from the volume space 4. The auxiliary space 20 preferably has atmospheric pressure to allow air in the volume space 4 to flow into the inlet of the guide passage 5a communicating with the sensor SEN.

The output of the sensor SEN is led to, for example, an operational amplifier OP in a microprocessor CPU through a lead line L, where necessary, through a connector. The output of the sensor SEN is converted to "H (on)" or "L (off)" as output in the operational amplifier. A signal detect output AC determines the detect output, the H (on) or the L(off) in accordance with the length of on time or off time.

Figure 7:
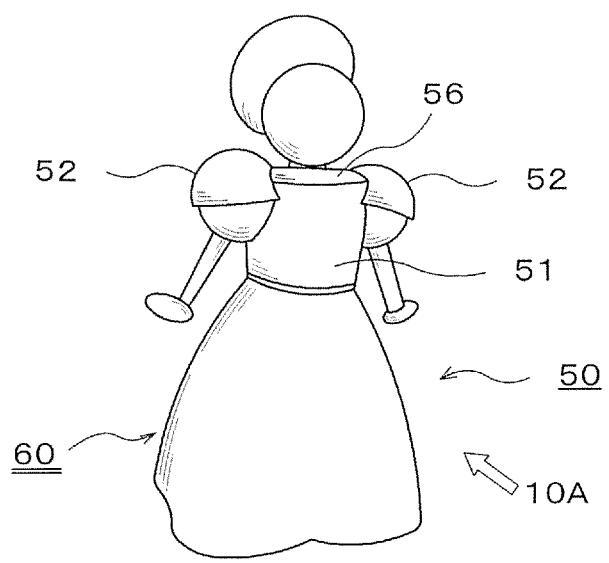
FIG. 7 is overall perspective view of a humanoid robot provided with a contact detecting device according to an embodiment of the present invention.

FIG. 7 is a perspective view of a humanoid robot 50 of the contact detecting device according to an embodiment. The design foam 10 is bonded to the mounted base 60 or the entire humanoid robot 50, with the joining means 2. The columns 72 as the limiter 7 are disposed on the predetermined position. The humanoid robot 50 shown in FIG. 7 to FIG. 10 contains general-purpose hardware and a general-purpose software, not shown. The design foam 10 has a top periphery that is bonded to the mounted base 60 with the joining means 2. The design foam 10 has the columns 72 as the limiter 7, which are integral with the design foam 10. The limiter 7 includes a common base with a thickness M as the design base 70 and abutment parts with a thickness N, which function as the limiter 7 (referring to limiter parts N) directly.

Thus, the limiter 7 includes the common base as the design base 70 having a thickness M and the abutment parts having a thickness N (referring to the limiter parts N of FIG. 5). The abutment parts abut on the mounted base 60 directly and function as the limiter 7. The limiter 7 may have a cylinder, column, prism, polygon tube, rib, circular cut-outs, or polygon cut-outs.

FIG. 7 to FIG. 10 are principle perspective views showing the appearance of the chest 51 and the shoulders 52 of the humanoid robot 50. A corner 55 of FIG. 8 may have a space with two or three dimensions for containing a microprocessor CPU spaced from the sensor SEN. The space of the corner 55 may contain a battery as necessary. The sensor SEN and the battery may be disposed on any place in the humanoid robot 50, so long as the humanoid robot 50 has intended appearance.

Figure 8:
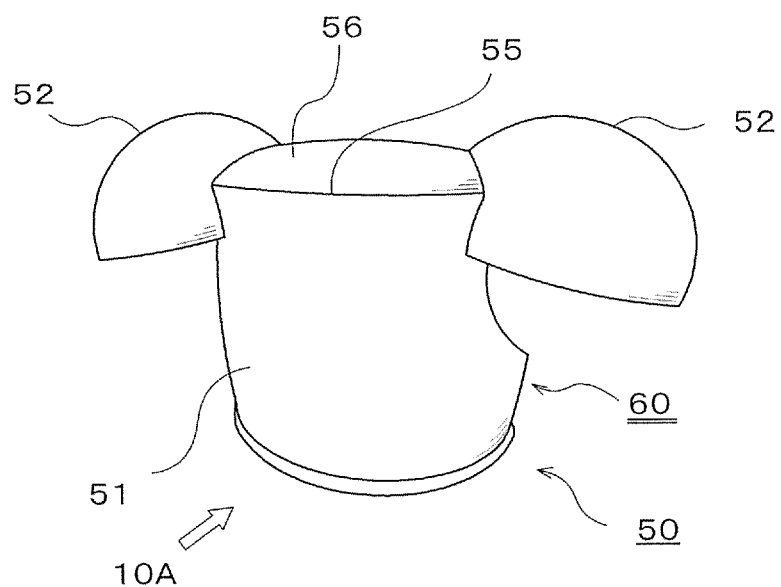
FIG. 8 is overall perspective view from the design surface side of the chest of the humanoid robot.
Figure 9:
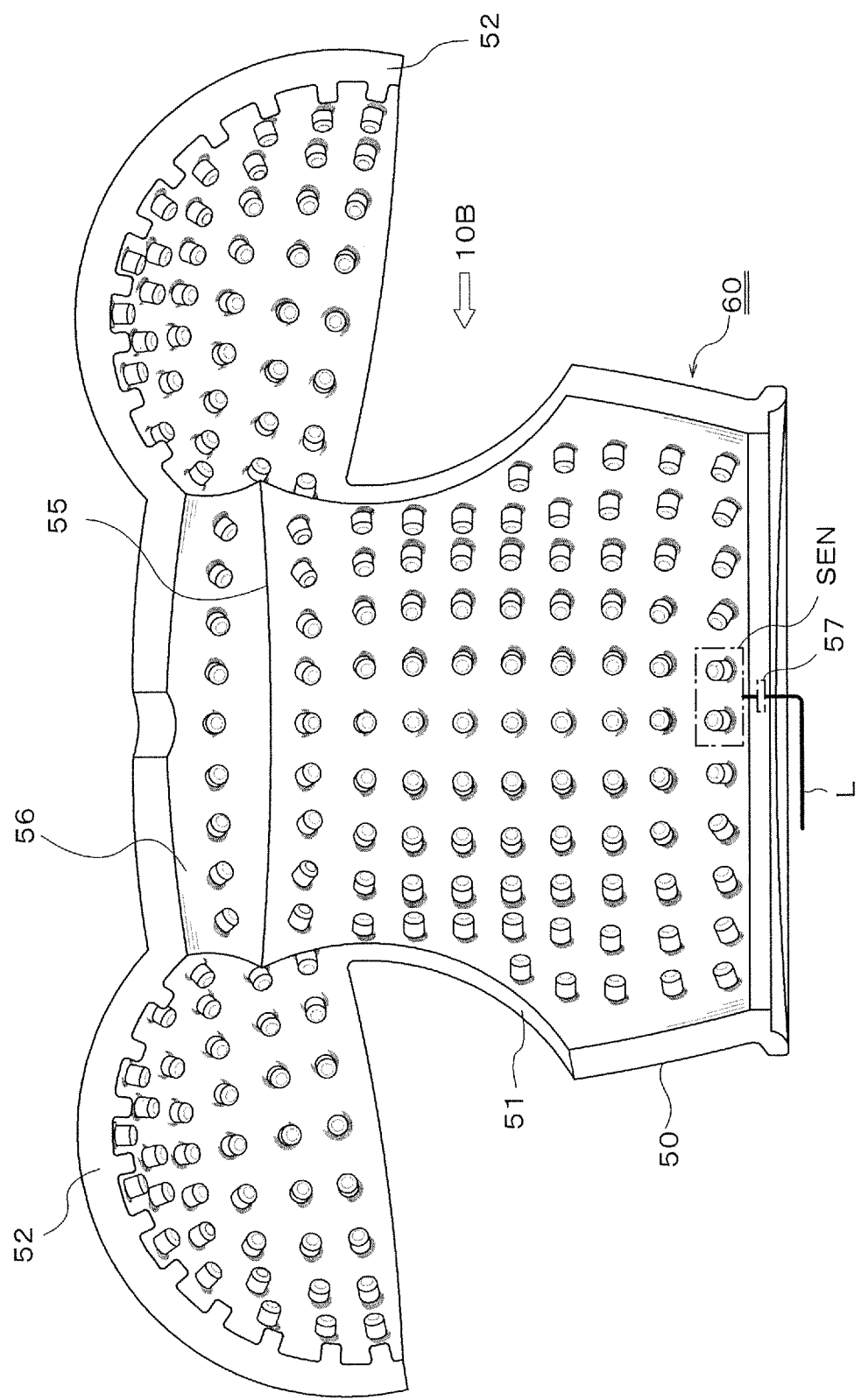
FIG. 9 is overall back view from the non-design surface side of the chest of the humanoid robot.
Figure 10:
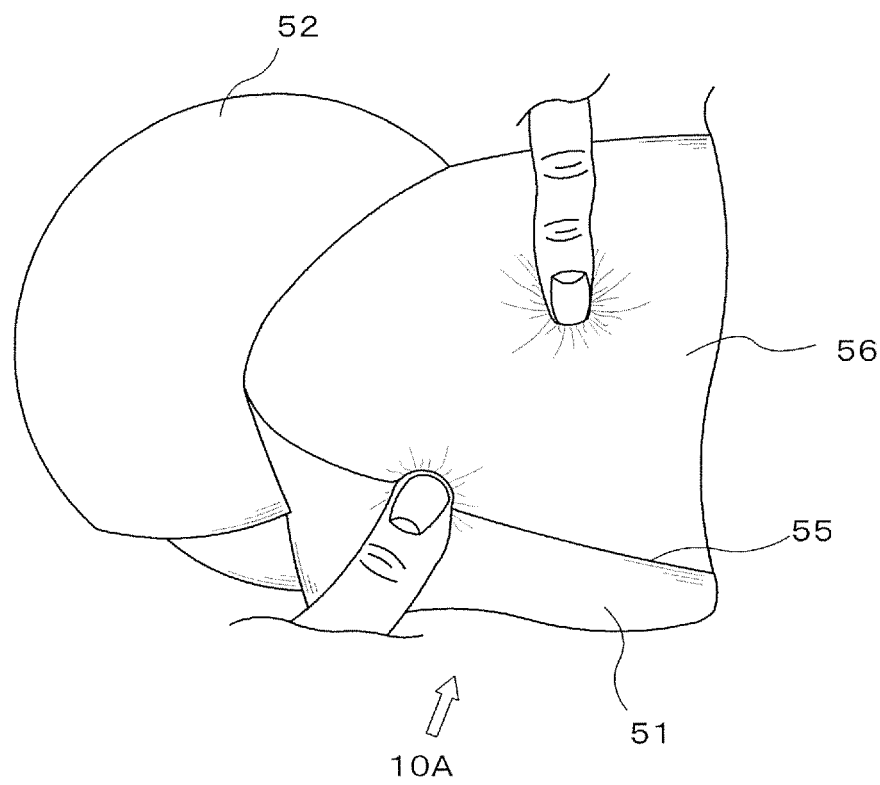
FIG. 10 is principle perspective view of the chest pressed from the outside.

FIG. 8 is s perspective view from the outside of the chest 51 or from the design surface 10A. FIG. 9 is s perspective view from the inside of the chest 51.

The humanoid robot 50 of an embodiment contains a foam synthetic resin plate formed of an open-cell foam (not shown). The plate is in the inside of the mounted base 60. The humanoid robot 50 with the plate have a predetermined volume. The mounted base 60 (the humanoid robot 50) and the design foam 10 covering the mounted base 60 define the volume space 4. The volume space 4 is closed so that air in the volume space 4 to fail to go out. This enables air with pressure to be applied to the sensor SEN only. The sensor SEN is fixed to the mounted base 60 (the humanoid robot 50) made from metal. In the present embodiment, the sensor SEN has a predetermined output in response to pressure applied on the corner 55 and a neck 56 shown in FIG. 10.

Figure 11A:
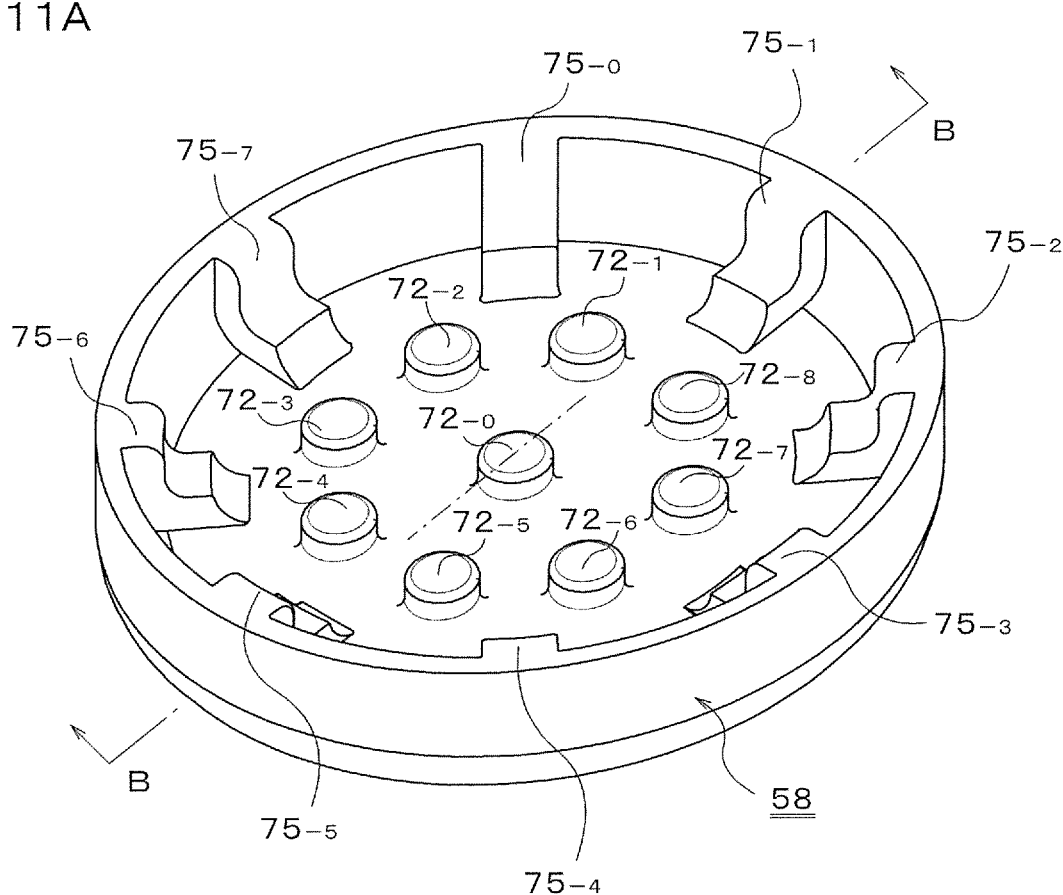
FIG. 11A is a principle perspective view of the design foam viewed from the non-design surface side of the design foam of a contact detecting device according to another embodiment of the present invention.
Figure 11B:
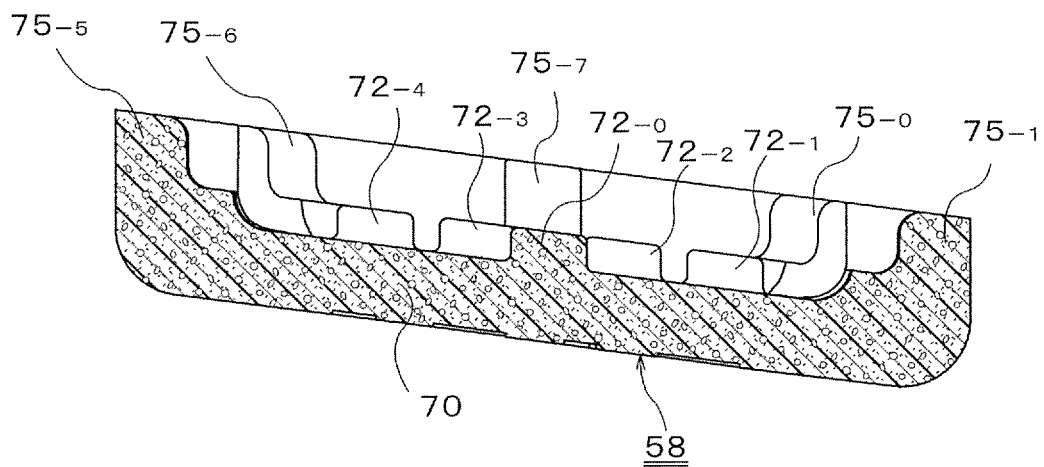
FIG. 11B is a cross-sectional view of the design foam taken along the line B-B of FIG. 11A.

FIGS. 11A and 11B illustrate a contact detecting cover 58 for control, which covers a lid. The contact detecting cover 58 of the contact detecting device according to an embodiment includes the design foam 10 and the limiter 7. The contact detecting cover 58 has a column $72_{-0}$ in the middle, eight columns $72_{-1}$ to $72_{-8}$ around the column $72_{-0}$, and ribs $75_{-1}$ to $75_{-8}$ around the columns $72_{-1}$ to $72_{-8}$.

When any one of the column $72_{-0}$, the columns $72_{-1}$ to $72_{-8}$ around the column $72_{-0}$, and the ribs $75_{-0}$ to $75_{-7}$ around the columns $72_{-1}$ to $72_{-8}$ is pressed, the pressing touch is detected. Here, the limiter 7 includes the design base 70 and the columns $72_{-0}$ to $72_{-8}$ in series.

Figure 12A:
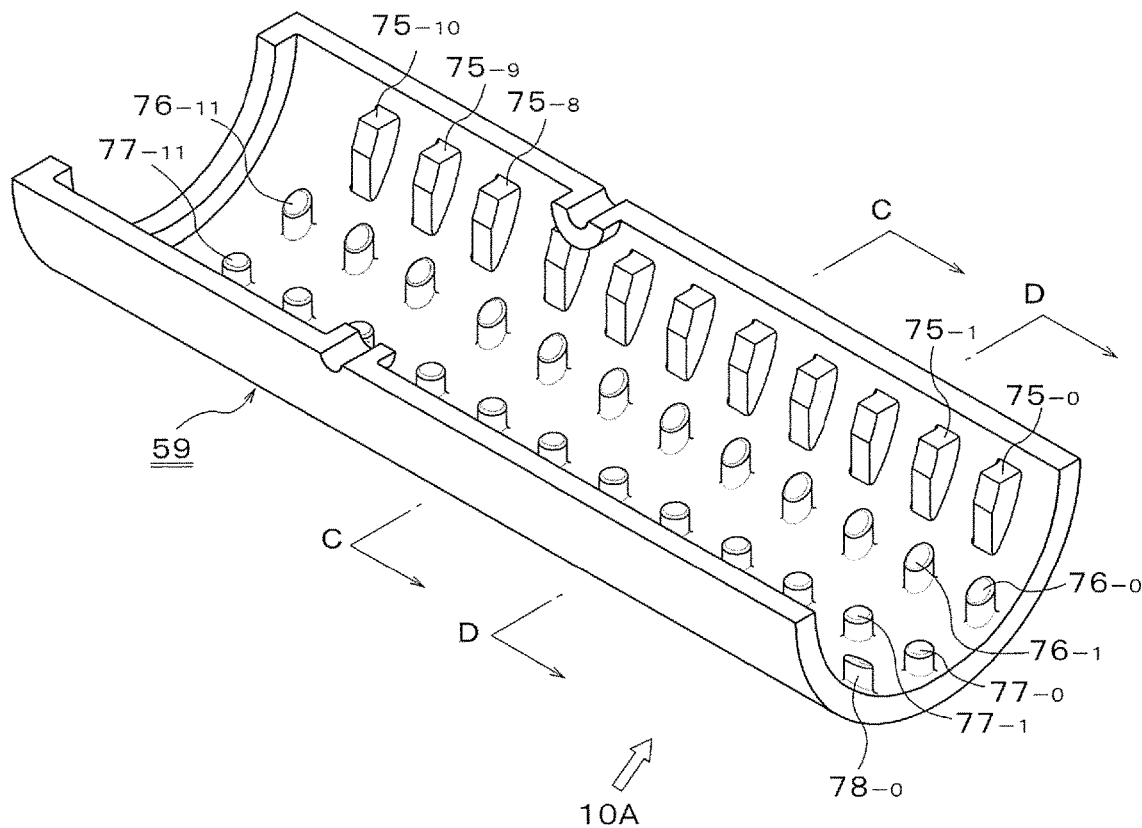
FIG. 12A is a principle perspective view of the design foam viewed from the non-design surface side of the design foam of a contact detecting device according to still another embodiment of the present invention.
Figure 12B:
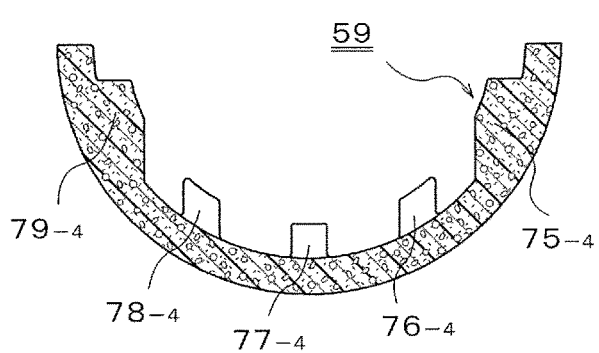
FIG. 12B is a cross-sectional view of the design foam taken along the line C-C of FIG. 11A.
Figure 12C:
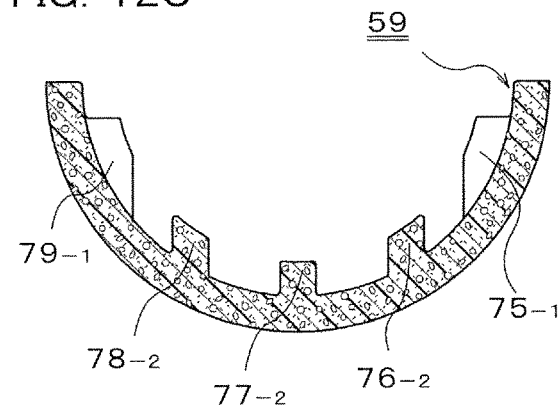
FIG. 12C is a cross-sectional view of the design foam taken along the line D-D of FIG. 11A.
Figure 13A:
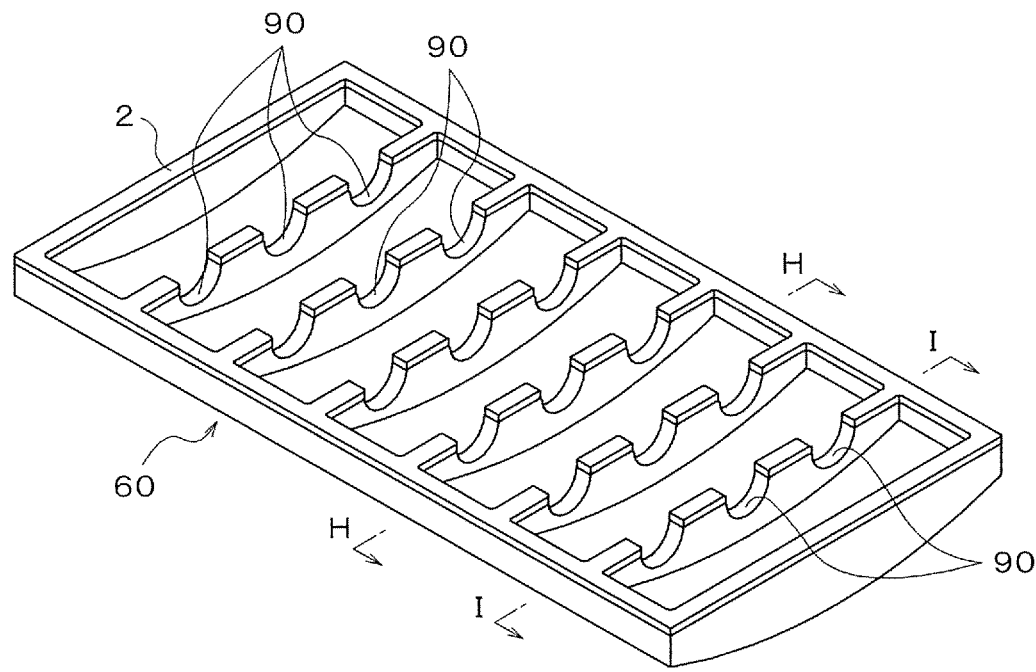
FIG. 13A shows the design foam viewed from the non-design surface side of the design foam of a contact detecting device according to still another embodiment of the present invention.
Figure 13B:
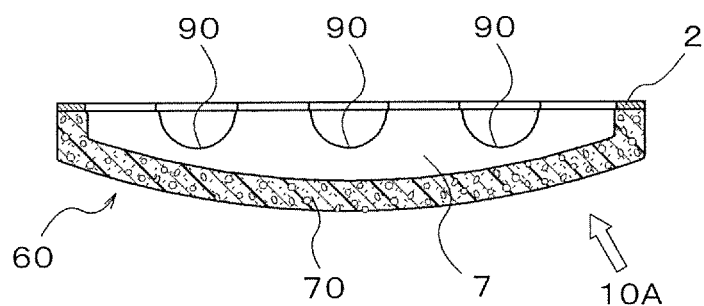
FIG. 13B is a cross-sectional view of the design foam taken along the line H-H of FIG. 13A.
Figure 13C:
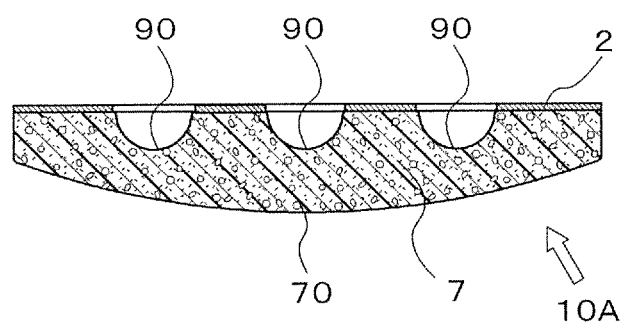
FIG. 13C is a cross-sectional view of the design foam taken along the line I-I of FIG. 13A.
Figure 14A:
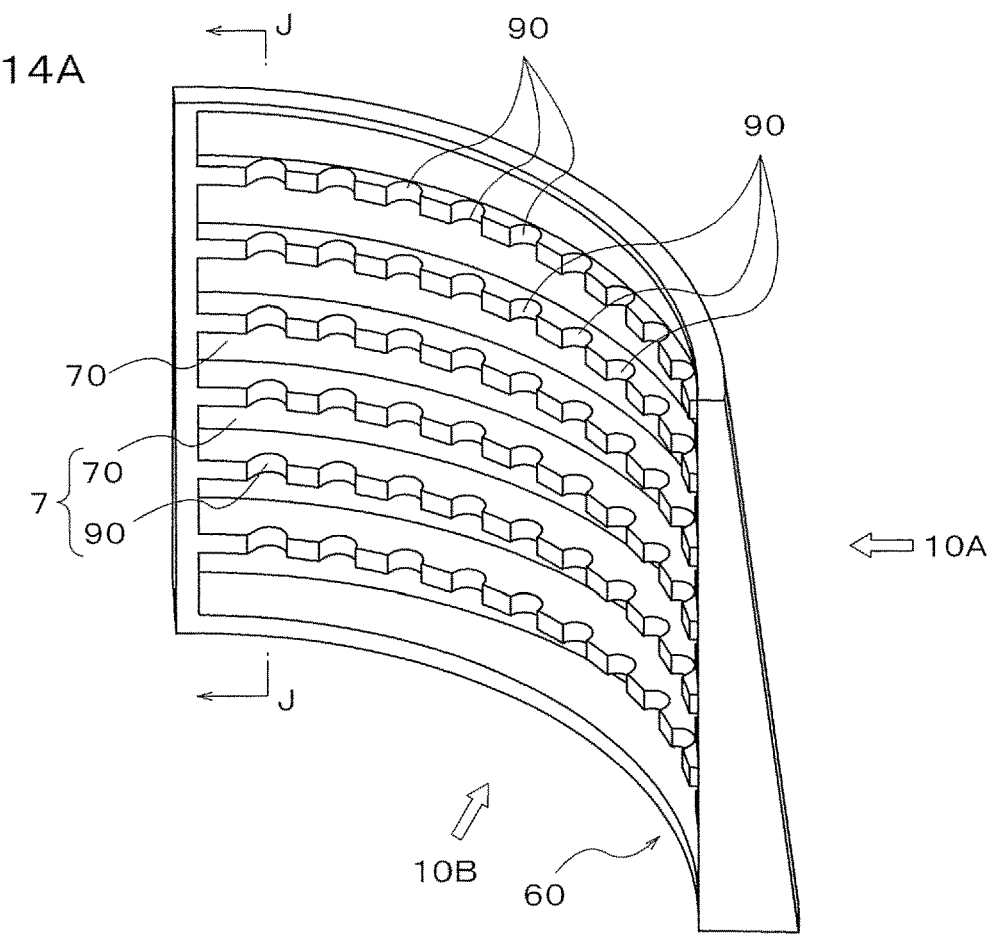
FIG. 14A shows the design foam viewed from the non-design surface side of the design foam of a contact detecting device according to still another embodiment of the present invention.
Figure 14B:
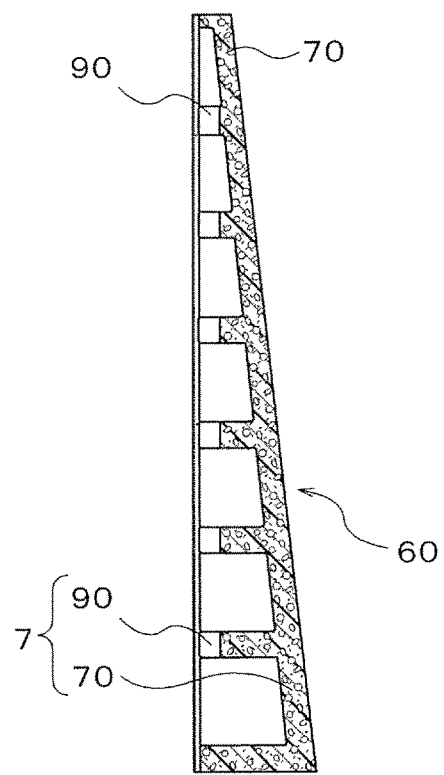
FIG. 14B is a cross-sectional view of the design foam taken along the line J-J of FIG. 14A.

FIGS. 12A, 12B, and 12C illustrate a contact detecting cover 59 for an operation rod. The contact detecting cover 59 of the contact detecting device according to an embodiment is easily demolded when being formed by molding. The contact detecting cover 59 is detachably mounted on an operation rod. A pair of the contact detecting covers 59 makes a tube or a ring for an operation rod. The contact detecting cover 59 includes fixing ribs $75_{-0}$ to $75_{-10}$ and fixing ribs $79_{-0}$ to $79_{-10}$ for small diameter centering. These fixing ribs allow registration of a pair of the contact detecting cover 59 before a pair of the contact detecting covers 59 is screwed. The contact detecting cover 59 further includes plasticized ribs $76_{-0}$ to $76_{-11}$, plasticized ribs $77_{-0}$ to $7_{-11}$, and plasticized ribs $78_{-0}$ to $78_{-11}$ for large diameter centering. These plasticized ribs function as contact detection.

Applied external pressure travels across individual plasticized ribs $76_{-0}$ to $76_{-11}$, plasticized ribs $77_{-0}$ to $7_{-11}$, or plasticized ribs $78_{-0}$ to $78_{-11}$. These plasticized ribs $76_{-0}$ to $76_{-11}$, plasticized ribs $77_{-0}$ to $7_{-11}$, and plasticized ribs $78_{-0}$ to $78_{-11}$ limit air pressure variation. The sensor SEN detects the amount of physical variation limited by the plasticized ribs $76_{-0}$ to $76_{-11}$, plasticized ribs $77_{-0}$ to $7_{-11}$, and plasticized ribs $78_{-0}$ to $78_{-11}$. Thus, the pressure of grasping is detected.

FIGS. 13A, 13B, and 13C and FIGS. 14A and 14B are perspective views from the non-design surface 10B side of the design foam 10 of the contact detecting device according to an embodiment of FIG. 5. The design foam 10 is bonded to the mounted base 60 of the humanoid robot 50 with the joining means 2. The design foam 10 has the limiter 7 with cut-outs 90 in place.

The design foam 10 has a top periphery that is bonded to the mounted base 60 with the joining means 2.

The design foam 10 has the limiter 7 with cut-outs 90. This limiter 7 is integral with the design foam 10. In the design foam 10, partitioned spaces are communicated with each other through the cut-outs 90. Consequently, when any position on the design surface 10A of the design foam 10 is pressed, the sensor SEN detects the pressure and then outputs the detection information without the design surface 10A having stress. The limiter 7, which is integrally formed with the design foam 10, includes the design base 70 with the cut-outs 90.

FIG. 14 is a perspective view from the non-design surface 10B of the design foam 10 of the contact detecting device according to an embodiment. The design foam 10 with a taper is bonded to the mounted base 60 of the humanoid robot 50 with the joining means 2. The design foam 10 has the limiter 7 with cut-outs 90 in place. The design foam 10 has a top periphery that is bonded to the mounted base 60 with the joining means 2.

The design foam 10 with a taper has the limiter 7 with cut-outs 90. The limiter 7 is integral with the design foam 10. In the design foam 10, partitioned spaces are communicated with each other through the cut-outs 90. Consequently, when any position on the design surface 10A of the design foam 10 with a taper is pressed, the sensor SEN detects the pressure and then outputs the detection information without the design surface 10A having stress.

The limiter 7 also includes the design base 70 with the cut-outs 90.

Figure 15A:
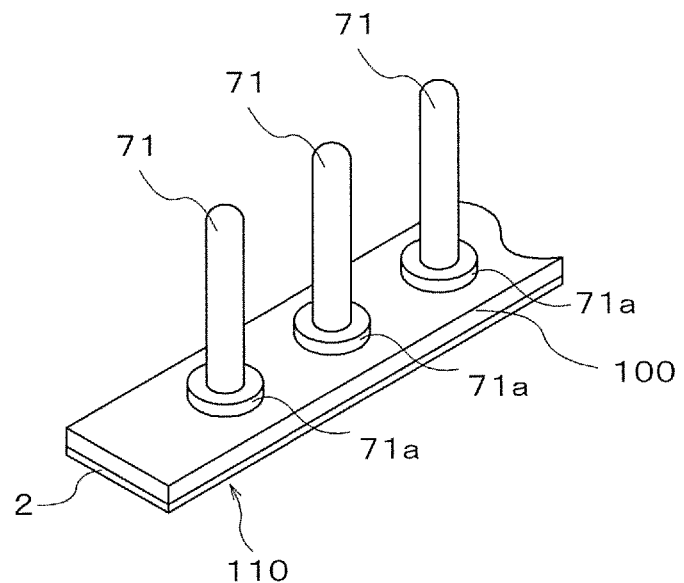
FIG. 15A is a principle perspective view of a row of cylinders of the design foam of a contact detecting device according to an embodiment of the present invention.
Figure 15B:
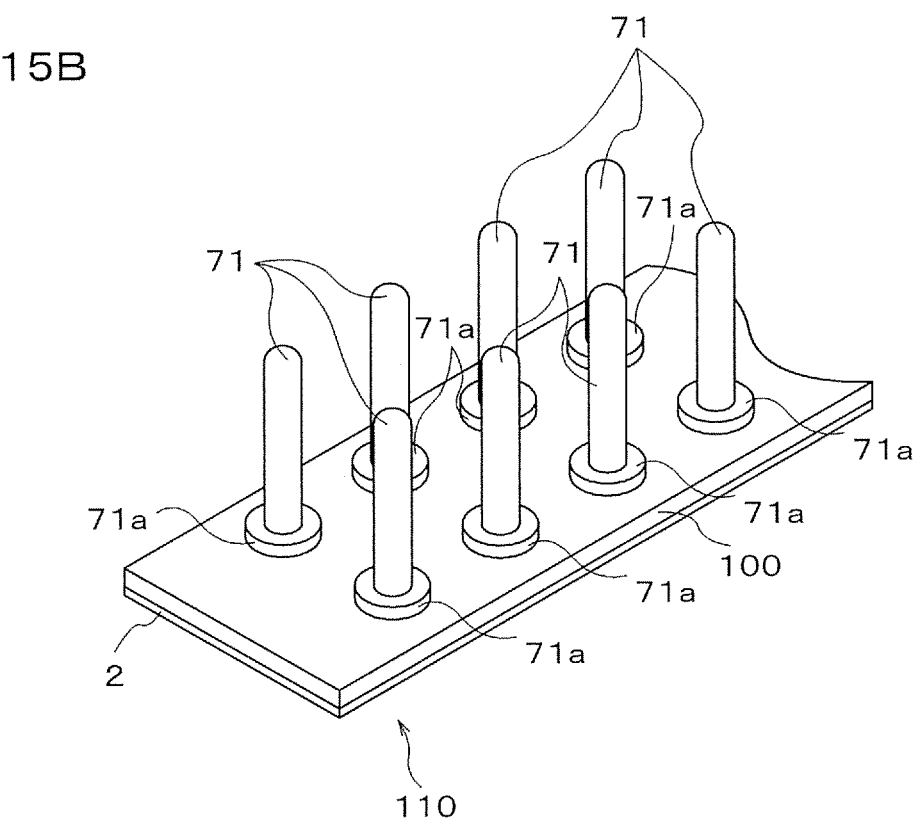
FIG. 15B is a principle perspective view of two rows of cylinders of the design foam of a contact detecting device according to an embodiment of the present invention.

FIG. 15A is a perspective view illustrating the cylinders 71 set in a row in the contact detecting device according to an embodiment. FIG. 15B is a perspective view illustrating the cylinders 71 set in two rows in the contact detecting device according to an embodiment. A tape base 100 has one surface with double-sided tape or adhesive. Each column 72 has the bonding flange 72a at the bottom surface.

When the tape base 100 having the flange(s) 72a is adhered to the mounted base 60, the intervals of the cylinders 71 on the tape base 100 is reflected in the contact detecting device.

The wider tape base 100 with the cylinders 71 or the columns 72 may be cut into any shape and this cut tape may be adhered to the mounted base 60. Alternatively, the cylinders 71 or the columns 72 is attached to the tape base 100 adhered to the mounted base 60 so that the cylinders 71 or the columns 72 are disposed at predetermined intervals.

Summaries of the embodiments are shown in FIGS. 16A, 16B, 16C, 16D, 16E, and 16F.

In FIG. 16A, the design foam 10 and the mounted base 60 are opposite to each other. The design foam 10 and the mounted base 60 define the volume space 4. The design foam 10 then has the joining means 2 at the outermost and entire perimeter in the non-design side, or specifically at the bonding surfaces 1a and 1e. This yields the acceptable clearance $\delta=0.5$ to 15 mm and forms an enclosing wall (which is comparable to the dimensions of the acceptable clearance) on the perimeter of the design foam 10. The limiter 7 of this embodiment includes the columns 72 and the design base 70, which are the same in material: foam synthetic resin or foam synthetic rubber. As the foam synthetic resin of the design foam 10, polyurethane (PUR), polystyrene (PS), polyolefin, which is mainly polyethylene (PE) or polypropylene (PP), or foam resin such as phenol resin (PF), polyvinyl chloride (PVC), urea resin (UF), silicone (SI), polyimide (PI), or melamine resin (MF) is employed. The mounted base 60 is formed of solid thermoplastic synthetic resin, foam thermoplastic synthetic resin, or a metal plate made of aluminum, stainless steel, iron, copper, or brass.

In FIG. 16B, the design foam 10 and the mounted base 60 are opposite to each other. The design foam 10 and the mounted base 60 define the volume space 4. The design foam 10 then has the joining means 2 at the outermost perimeter in the non-design side, or specifically at the bonding surfaces 1a and 1e. This yields the acceptable clearance $\delta=0.5$ to 15 mm and forms an enclosing wall (which has a height equal to the acceptable clearance) on the perimeter of the design foam 10. The limiter 7 of this embodiment includes the design base 70 and the columns 72. The design base 70 is formed of a synthetic resin foam or a synthetic rubber foam. The columns 72 are disposed on the mounted base 60. The design foam 10 and the design base 70 has the same material as the above-described embodiment of FIG. 16A. The top end of each cylinder 71 as the limiter 7 may be bonded to the mounted base 60. Alternatively, the limiter 7 may define the acceptable clearance.

In FIG. 16C, the design foam 10 and the mounted base 60 are opposite to each other. The design foam 10 and the mounted base 60 define the volume space 4. The design foam 10 then has the joining means 2 at the outermost and entire perimeter in the non-design side, or specifically at the bonding surfaces 1*a* and 1*e*. This yields the acceptable clearance δ=0.5 to 15 mm and forms an enclosing wall (which has a height equal to the acceptable clearance) on the perimeter of the design foam 10. The limiter 7 of this embodiment includes the design base 70 and the cylinders 71. The design base 70 is formed of a synthetic resin foam or a synthetic rubber foam. The cylinders 71 are disposed on the mounted base 60. The design foam 10 and the design base 70 are the same material as the above-described embodiment of FIG. 16B. This embodiment of FIG. 16C differs from the embodiment of FIG. 16B in including the mounted base 60 that is formed of a plate and including the cylinders 71 instead of the columns 72. The limiter 7 is disposed on the mounted base 60 with a plate. The limiter 7 may define the acceptable clearance. Alternatively, the limiter 7 may be bonded to the mounted base 60 instead of defining the acceptable clearance.

In FIG. 16D, the design foam 10 and the mounted base 60 are opposite to each other. The design foam 10 and the mounted base 60 define the volume space 4. The design foam 10 then has the joining means 2 at the outermost and entire perimeter in the non-design side, or specifically at the bonding surfaces 1*a* and 1*e*. This yields the acceptable clearance δ=0.5 to 15 mm and forms an enclosing wall (which has a height equal to the acceptable clearance) on the perimeter of the design foam 10. The limiters 7 of this embodiment is disposed between the design base 70 made of foam synthetic resin or foam synthetic rubber and the mounted base 60. The limiter 7 is formed of, for example, solid thermoplastic synthetic resin, foam thermoplastic synthetic resin, or a metal plate made of aluminum, stainless steel, iron, copper, or brass. The design foam 10 and the mounted base 60 have simple shapes. The limiter 7 is disposed on this simple mounted base 60. The acceptable clearance may be closer to the design foam 10 or the acceptable clearance may be closer to the mounted base 60.

The limiter 7 may be bonded to the design foam 10 and the mounted base 60. Alternatively, the limiter 7 may have one free end that defines the acceptable clearance.

In FIG. 16E, the design foam 10 and the mounted base 60 are opposite to each other. The design foam 10 and the mounted base 60 define the volume space 4. The design foam 10 then has the joining means 2 at the outermost and entire perimeter in the non-design side, or specifically at the bonding surfaces 1*a* and 1*e*. This yields the acceptable clearance δ=0.5 to 15 mm and forms an enclosing wall (which has a height equal to the acceptable clearance) on the perimeter of the design foam 10. The limiter 7 of this embodiment is formed of the cylinders 71.

This embodiment of FIG. 16E differs from the embodiment of FIG. 16C in having the joining means 2 at the bonding surfaces 1*a* and 1*e* of the outmost and entire perimeter of the design foam 10 to yield the acceptable clearance. Thus, the joining means 2 is easily print-applied on the surfaces of the design foam 10.

In FIG. 16F, the design foam 10 and the mounted base 60 are opposite to each other. The design foam 10 and the mounted base 60 define the volume space 4. The design foam 10 then has the joining means 2 at the outermost and entire perimeter in the non-design side, or specifically at the bonding surfaces 1*a* and 1*e*. The design foam 10 is bonded to the mounted base 60 through a piece 66 with the joining means 2. This yields the acceptable clearance δ=0.5 to 15 mm and forms an enclosing wall (which has a height equal to the acceptable clearance) on the perimeter of the design foam 10. The limiters 7 of this embodiment is disposed between the design base 70 made of foam synthetic resin or foam synthetic rubber and the mounted base 60. The limiter 7 is formed of solid thermoplastic synthetic resin, foam thermoplastic synthetic resin, or a metal plate with aluminum, stainless, steel, iron, copper, or brass.

This embodiment of FIG. 16F differs from the embodiment FIG. 16D in including the piece 66. This piece 66 minimizes the displacement of the mounted base 60.

Thus, the limiter 7 is disposed on the mounted base 60, the design foam 10, or both. This limiter 7 restricts the physical displacement of the non-design surface side of the design foam 10 when external pressure is applied to the design foam 10. The limiter 7 may be bonded to both of the mounted base 60 and the design foam 10. However, the limiter 7 preferably have one free end that is not bonded.

The embodiment of FIG. 6 has no volume space 4. In certain embodiments, the contact detecting device includes the volume varying body 8 instead of the volume space 4. The volume varying body 8 varies in the volume and acts in a similar to the volume space 4. The volume varying body 8 is equivalent to the volume space 4 in theory. Thus, the volume varying body 8 will not be further elaborated here.

The predetermined volume space 4, which is defined by the mounted base 60, the design foam 10, and the limiter 7 having an end integrated with the mounted base 60 or the design foam 10, may be a resilient structure such as the volume varying body 8.

The contact detecting device according to the above-described embodiments includes the mounted base 60 with a predetermined shape and the design foam 10 that is mounted on the mounted base 60 and covers it. The design foam 10 is formed of a synthetic resin foam with a predetermined shape or a rubber foam with a predetermined shape. The contact detecting device further includes the limiter 7 disposed on the mounted base 60, the design foam 10, or both. The limiter 7 restricts the physical displacement of the non-design surface 10B of the design foam 10. The physical displacement results from applied external pressure. The contact detecting device further includes the predetermined volume space 4 or the volume varying body 8 formed of a resilient structure. The volume space 4 is defined by the mounted base 60, the design foam 10, and the limiter 7, which have an end integrated with the mounted base 60 or the design foam 10. The volume varying body 8, which varies in the volume, acts as the volume space 4. The contact detecting device further includes the sensor SEN that detects the external pressure applied to the volume space 4 or the volume varying body 8 through the determination of the physical variation of the volume space 4 or the volume varying body 8.

The limiter 7 is attached to or formed on the mounted base 60 and/or the design foam 10 as the cylinder (s) 71 or the column(s) 72 is. The limiter 7 may have prism(s), polygon tube(s), or rib(s). The limiter 7 may be distinguished from the design base 70. Alternatively, the cylinder(s) 71, the column(s) 72, prism(s), polygon tube(s), or rib(s) as the limiter 7 may be integrated with the design base 70 as shown in FIG. 5. The limiter 7 may be made of foam thermoplastic synthetic resin or the limiter 7 may be made of solid synthetic resin.

The design foam 10 with a predetermined shape is mounted on the mounted base 60 and converts the mounted base 60. The limiter 7, which is integrated with the synthetic resin foam and/or the rubber foam, is disposed in the non-design surface 10B side of the design foam 10. The design foam 10, the mounted base 60, and the limiter 7 define the predetermined volume space 4. Alternatively, the volume varying body 8, which is a resilient structure and varies in the volume, acts as the volume space 4. The predetermined volume space 4, which is enclosed except where air for the sensor SEN inflows or outflows, is subjected to pressure. Thus, the contact detecting device is used in a particular exterior such as a robot exterior. The limiter 7, which is integrated with the synthetic resin foam or the rubber foam, enables the design foam 10 to have a fixed depression and physical variation no matter where external pressure is applied on the design surface 10A of the foamed design 10. A device having different intervals between the mounted base 60 and the non-design surface 10B formed into, for example, an inverted U-shape, might vary in the curve and the physical displacement of the design foam 10 in accordance with pressed position of the design surface 10A of the design foam 10. However, the limiter 7, which is integrated with the synthetic resin foam or the rubber foam, prevents variation in the curve and the physical displacement. The limiter 7 may have cylinder(s), column(s), prism(s), polygon tube(s), rib(s), circular cut-outs, or polygonal cut-outs. Alternatively, the limiter 7 may be formed of a flexible tape with a uniform thickness. This flexible tape may have one or more cylinders, columns, prisms, polygon tubes, or ribs. The limiter 7 is attached to the mounted base 60 and/or the design foam 10, or integrated with them.

The design foam 10 is mounted on the mounted base 60 with a predetermined shape and covers it. The design foam 10 has the limiter 7 integrated with it. These design foam 10, the mounted base 60, and the limiter 70 define the predetermined volume space 4. Alternatively, the volume varying body 8, which is a resilient structure and varies in the volume, acts as the volume space 4. The sensor SEN detects the external pressure applied to the volume space 4 or the volume varying body 8 through the determination of the physical variation of the volume space 4 or the volume varying body 8. The sensor SEN outputs the detection information as electrical signal. No matter where a certain external pressure is applied to, the sensor SEN has less variation in the output. Thus, the sensor SEN provides fixed output in response to the pressure applied to the volume space 4 or the volume varying body 8.

The design foam 10, which is mounted on the mounted base 60 with a predetermined shape and covers it, has the design surface 10A. Since external pressure is applied to part of the design foam 10, the design surface 10A is free from, for example, stress. Additionally, the limiter 7 is disposed between the design foam 10 and the mounted base 60. This limiter 7 restricts the sink, dent, or deformation of the design surface 10A of the design foam 10. This allows the design surface 10A to have any resilience. The non-design surface 10B of the design foam 10 is displaced between an acceptable clearance δ=0 to 5 mm. Thus, the design foam 10 returns to normal without having stress and the degradation of the design surface 10A.

The contact detecting device according to the embodiments of the present invention can be formed by injection-molding, if desired. This reduces the device cost.

According to the contact detecting device of the embodiments of the present invention, the physical variation can be changed as desired by varying the pitch between the limiter(s) 7 or the height of the limiter 7. This allows the output value of the sensor SEN, which detects the physical variation, to be set as desired.

In the contact detecting device above described, the limiter 7, which has a predetermined shape and supports the mounted base 60, includes at least one cylinder, column, prism, hollow prism, or rib.

Thus, the sensor SEN, which detects the physical variation of the volume space 4 or the volume varying body 8 subjected to external pressure and outputs the detection information as electrical signal, fails to vary in the output according to difference in pressed position. The cylinder(s) 72, column(s) 71, prism(s), polygon tube(s), and rib(s) are used as prop(s) to reduce the curvature of the design foam 10 within a predetermined range. The cylinder(s) 72, column(s) 71, prism(s), polygon tube(s), and rib(s) that stand vertically to a plane can divide applied external pressure. Thus, the pressure applied to the volume space 4 allows the fixed output of the sensor SEN.

In certain embodiments, the limiter 7, which has a predetermined shape and supports the mounted base 60, has circular cut-outs 90 or polygonal cut-outs. The cut-outs with circle or polygon including triangle acts as air pathway for air flow. Additionally, the cut-outs with polygon including triangle allow any air flow resistance to be set. Thus, the design surface 10A of the design foam with a predetermined shape has intended visual appearance. The limiter 7 with a predetermined shape has circular cut-outs or polygonal cut-outs. The cut-outs with circle or polygon allow air flow near the mounted base side. Thus, the air fails to cool down rapidly and fails to create water drops.

In certain embodiments, the limiter 7, which has a predetermined shape and supports the mounted base 60, is formed of a flexible tape with a uniform thickness. This flexible tape has one or more cylinders, columns, prisms, polygon tubes, or ribs. Thus, the used of the sticking flexible tape, which has a uniform thickness and has one or more cylinders, columns, prisms, polygon tubes, or ribs, allows continuous variation in the resilience. In particular, the flexible tape adhered on the mounted base acts as part of the mounted base. The design foam 10 is then mounted on the mounted base with the flexible tape.

Thus, the limiter 7, which has a predetermined shape and supports the mounted base 60, is formed of a flexible tape with a uniform thickness. This flexible tape has one or more cylinders, columns, prisms, polygon tubes, or ribs. Thus, the used of the sticking flexible tape, which has a uniform thickness and has one or more cylinders, columns, prisms, polygon tubes, or ribs allows continuous variation in the resilience.

In particular, the flexible tape adhered on the mounted base acts as part of the mounted base. The design foam 10 is then mounted on the mounted base with the flexible tape.

According to the embodiments of the present invention, the design foam 10 is mounted on the mounted base 60 with a predetermined shape and covers it. The design foam 10 is formed of a synthetic resin foam with a predetermined shape or a rubber foam with a predetermined shape. The mounted base 60 or/and the design foam 10 has the limiter 7 that restricts physical displacement caused by pressure from the design surface 10A of the design foam 10. The mounted base 60, the design foam 10, and the limiter 7 with an end integrated with the mounted base 60 or the design foam 10 define the predetermined volume space 4 or the volume varying body 8. The sensor SEN detects external pressure applied to the volume space 4 through the determination of the physical variation of the volume space 4.

The limiter 7 mounted on the mounted base 60 and/or the design foam 10 may be the limiter 7 attached to the mounted base 60 and/or the design foam 10. Alternatively, the limiter 7 mounted on the mounted base 60 and/or the design foam 10 may be the limiter 7 integrally formed with the mounted base 60 and/or the design foam 10.

The limiter 7 may include a pair of cylinders 71, columns 72, prisms, polygon tubes, or ribs on the mounted base 60 and/or the design foam 10. The limiter 7 may be disposed on the top surface or bottom surface of the thick common base, or the design base 70.

EXPLANATION OF CODES

2 joining means
3 supporter
4 volume space
5 guide passage
6 inner frame
7 limiter
8 volume varying body
10 design foam
10A design surface
10B non-design surface
20 auxiliary space
50 humanoid robot
60 mounted base
70 design base
71 cylinder
72 column
SEN sensor

The invention claimed is:

1. A contact detecting device, comprising:
 a mounted base with a predetermined shape;
 a design foam covering the mounted base and bonded to the mounted base, the design foam being formed of a synthetic resin foam with a predetermined shape or a rubber foam with a predetermined shape;
 a limiter disposed on the mounted base and/or the design foam, the limiter configured to restrict physical displacement of a non-design surface side of the design foam, the physical displacement resulting from external pressure; and
 a sensor configured to detect the external pressure applied to a predetermined volume space through determination of physical variation of the volume space, the volume space being defined by the mounted base, the design foam, and the limiter,
 wherein the limiter includes a cylinder, column, prism, polygon tube, or rib that extends in a first direction from one among the mounted base and the design foam, toward the other among the mounted base and the design foam.

2. The contact detecting device according to claim 1, wherein the cylinder, the column, the prism, the polygon tube, or the rib includes a flange at at least one end thereof.

3. The contact detecting device as in claim 1, wherein the limiter has circular cut-outs or polygonal cut-outs.

4. A contact detecting device, comprising:
 a mounted base with a predetermined shape;
 a design foam covering the mounted base and bonded to the mounted base, the design foam being formed of a synthetic resin foam with a predetermined shape or a rubber foam with a predetermined shape;
 a limiter disposed on the mounted base and/or the design foam, the limiter configured to restrict physical displacement of a non-design surface side of the design foam, the physical displacement resulting from external pressure; and
 a sensor configured to detect the external pressure applied to a predetermined volume space through determination of physical variation of the volume space, the volume space being defined by the mounted base, the design foam, and the limiter,
 wherein the limiter comprises a flexible tape with a uniform thickness.

5. The contact detecting device according to claim 1,
 wherein the limiter includes a plurality of the cylinder, the column, the prism, the polygon tube, or the rib that extend in the first direction, and
 wherein the plurality of the cylinder, the column, the prism, the polygon tube, or the rib are spaced apart from each other in another direction that is perpendicular to the first direction.

6. The contact detecting device according to claim 5, further comprising an inner frame that is disposed between the mounted base and the design foam,
 wherein the limiter is provided between the inner frame and the design foam.

7. The contact detecting device according to claim 6, wherein the inner frame has a box shape.

8. The contact detecting device according to claim 6, wherein the sensor is configured to detect the external pressure based on air that moves through a passage through the inner frame.

9. The contact detecting device according to claim 5, wherein the plurality of the cylinder, the column, the prism, the polygon tube, or the rib include a flange at at least one end thereof.

10. The contact detecting device according to claim 1, wherein a clearance is provided between the cylinder, the column, the prism, the polygon tube, or the rib and the other from among the mounted base and the design foam.

11. A contact detecting device, comprising:
 a mounted base with a predetermined shape;
 a design foam covering the mounted base and bonded to the mounted base, the design foam being formed of a synthetic resin foam with a predetermined shape or a rubber foam with a predetermined shape;
 a limiter disposed on the mounted base and/or the design foam, the limiter configured to restrict physical displacement of a non-design surface side of the design foam, the physical displacement resulting from external pressure; and
 a sensor configured to detect the external pressure applied to a predetermined volume space through determination of physical variation of the volume space, the volume space being defined by the mounted base and the design foam, and the volume space configured to change in volume due to the external pressure,
 wherein a side of the limiter is in contact with the design foam or configured to get in contact with the design foam, such as to support the design foam and restrict the physical displacement of the non-design surface side of the design foam, and
 wherein a part of an outer surface of the side of the limiter is configured to neither directly nor indirectly contact the design foam while the side of the limiter is in contact with the design foam.

* * * * *